(12) United States Patent
Hanaoka et al.

(10) Patent No.: US 9,411,338 B2
(45) Date of Patent: Aug. 9, 2016

(54) SURROUNDING ENVIRONMENT RECOGNITION DEVICE, AUTONOMOUS MOBILE SYSTEM USING SAME, AND SURROUNDING ENVIRONMENT RECOGNITION METHOD

(71) Applicant: Sharp Kabushiki Kaisha, Osaka-shi, Osaka (JP)

(72) Inventors: Tohru Hanaoka, Osaka (JP); Toshihisa Matsuo, Osaka (JP); Kohhei Matsuo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/655,438

(22) PCT Filed: Nov. 28, 2013

(86) PCT No.: PCT/JP2013/082022
§ 371 (c)(1),
(2) Date: Jun. 25, 2015

(87) PCT Pub. No.: WO2014/132509
PCT Pub. Date: Sep. 4, 2014

(65) Prior Publication Data
US 2015/0362921 A1    Dec. 17, 2015

(30) Foreign Application Priority Data

Feb. 27, 2013    (JP) .................................. 2013-037823
May 27, 2013   (JP) .................................. 2013-110883

(51) Int. Cl.
*G05D 1/02* (2006.01)
*G01B 11/24* (2006.01)
*G09B 29/10* (2006.01)
(Continued)

(52) U.S. Cl.
CPC .............. *G05D 1/0248* (2013.01); *G01B 11/14* (2013.01); *G01B 11/24* (2013.01); *G05D 1/0088* (2013.01);
(Continued)

(58) Field of Classification Search
CPC .............. G05D 1/0248; G05D 1/0088; G05D 2201/0203; G05D 1/024; G05D 1/0274; G05D 1/0272; G09B 29/106; Y10S 901/01; G01B 11/24; G01B 11/14; A47L 2201/04
See application file for complete search history.

(56) References Cited

U.S. PATENT DOCUMENTS

| | | | |
|---|---|---|---|
| 2015/0042765 A1* | 2/2015 | Pfister ..................... | B60R 1/002 348/48 |
| 2015/0212333 A1* | 7/2015 | Goulanian ......... | H04N 13/0402 353/7 |

FOREIGN PATENT DOCUMENTS

| | | | |
|---|---|---|---|
| JP | 57-141574 A | 9/1982 | |
| JP | 60-200314 A | 10/1985 | |

(Continued)

OTHER PUBLICATIONS

Official Communication issued in International Patent Application No. PCT/JP2013/082022, mailed on Dec. 24, 2013.

*Primary Examiner* — Richard Camby
(74) *Attorney, Agent, or Firm* — Keating & Bennett, LLP

(57) ABSTRACT

A cleaning robot (1) which is an autonomous mobile system performs coordinate conversion of three-dimensional coordinate data acquired by measurement in a distance image sensor (20) which is arranged in a frontward and obliquely downward direction to generate three-dimensional coordinate data of a floor surface reference. Labels are applied to this data by judging a level difference or an obstacle according to height from a floor surface (F) to create overhead view image data seen from directly above a cleaning robot main body. The overhead view image data is scanned, and only when the labels are arranged in a specific order, processing for substituting an unspecified area with a level difference is performed. Thereby, positional deviation of an edge of the level difference, which is caused by a blind spot, is corrected and a position of the level difference is able to be grasped accurately.

5 Claims, 16 Drawing Sheets

(51) Int. Cl.
*G01B 11/14* (2006.01)
*G05D 1/00* (2006.01)

(52) U.S. Cl.
CPC .............. *G05D 1/024* (2013.01); *G05D 1/0274* (2013.01); *G09B 29/106* (2013.01); *A47L 2201/04* (2013.01); *G05D 1/0272* (2013.01); *G05D 2201/0203* (2013.01); *Y10S 901/01* (2013.01)

(56) References Cited

FOREIGN PATENT DOCUMENTS

| | | |
|---|---|---|
| JP | 07-229727 A | 8/1995 |
| JP | 2006-260105 A | 9/2006 |
| JP | 2010-287029 A | 12/2010 |

\* cited by examiner

FIG. 8
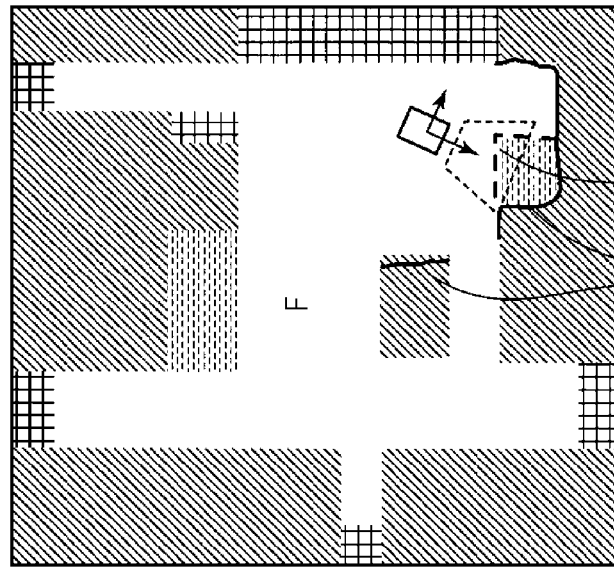
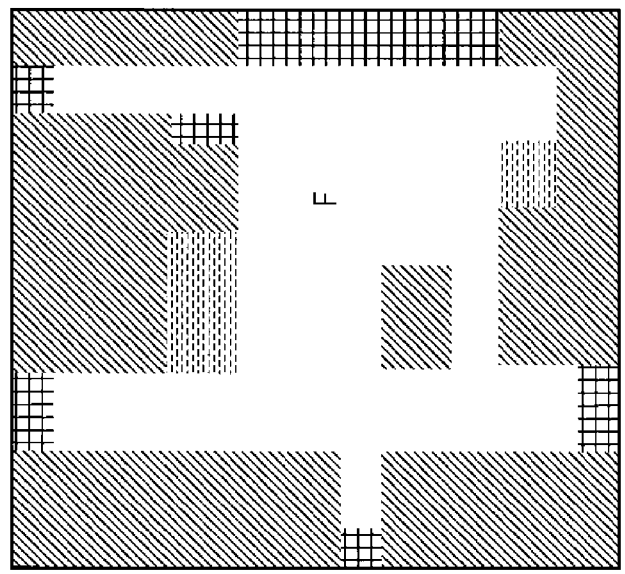

FIG. 16
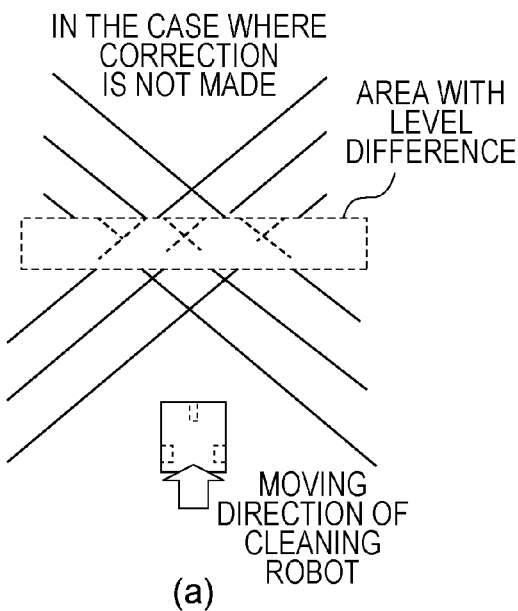
(a)
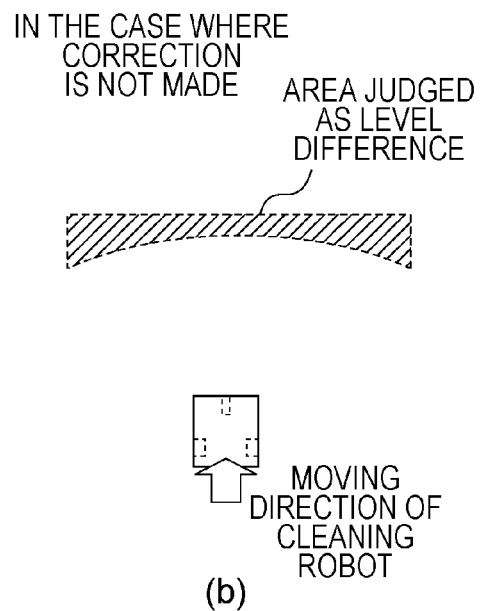
(b)
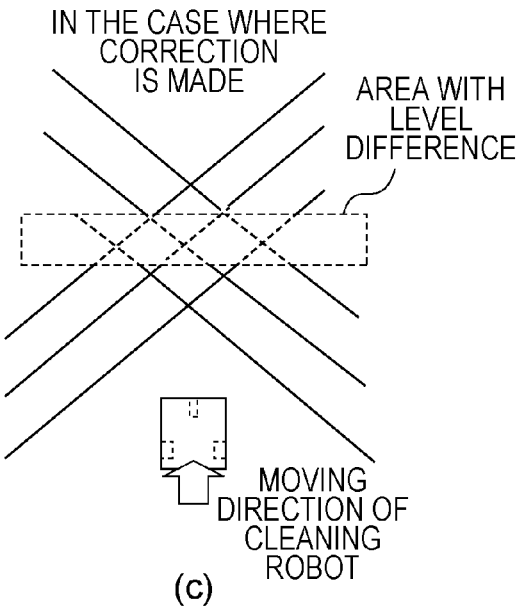
(c)
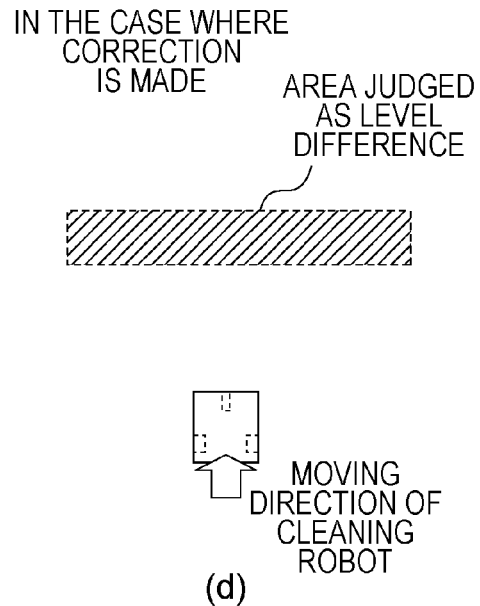
(d)

SURROUNDING ENVIRONMENT RECOGNITION DEVICE, AUTONOMOUS MOBILE SYSTEM USING SAME, AND SURROUNDING ENVIRONMENT RECOGNITION METHOD

TECHNICAL FIELD

The present invention relates to a surrounding environment recognition device for correctly recognizing, from data acquired by measuring a distance of a target surrounding environment, areas of a floor surface, an obstacle or a level difference, and the like included in a measurement range thereof, an autonomous mobile system using the same, and a surrounding environment recognition method.

BACKGROUND ART

In an autonomous mobile system such as a robot or an automatic guided vehicle, it is necessary to prevent collision and falling by detecting an obstacle or a level difference which is in front during movement. For such detection of an obstacle or a level difference, a surrounding environment recognition device using a sensor is being developed.

As a sensor which is used for such applications, a laser range finder (LRF) and a distance image sensor exist.

The laser range finder has a structure of performing angle scanning while projecting laser light to a measurement target and detecting reflection light therefrom to thereby measure a distance to the target. Though relatively high measurement accuracy is achieved, as the angle scanning is normally for one direction, acquired with single measurement is only distribution information of a one-dimensional distance. In order to acquire distribution of a two-dimensional distance, contrivances of performing measurement by arranging a plurality of laser range finders in parallel, performing measurement a plurality of times with mechanical movement, and the like are required.

As the distance image sensor, some types including a pattern light irradiation type, a time Of flight (TOF) type, and a stereo type exist according to a method for measuring a distance, but all of them are characterized by outputting a distance image in which distance information of a measurement target within a visual field range of an imaging element is represented by density of a pixel, making it possible to acquire two-dimensional distance information at a time with single measurement. Accordingly, it is suitable for using as a sensor of a surrounding environment recognition device which acquires a distance to a circumferentially existing object promptly and recognizes whether it is an obstacle or a level difference.

In an autonomous mobile system shown in PTL 1 (Japanese Unexamined Patent Application Publication No. 2006-260105), a distance image sensor which is attached so as to have a visual field range as a frontward lower side of an advancing direction is used to detect presence/absence of a convex obstacle and a concave level difference which exist on a frontward travelling surface. Further, the distance image is subjected to coordinate conversion, which is then binarized with two different thresholds, to thereby judge whether shapes of the obstacle and the level difference are slope shapes or step shapes.

CITATION LIST

Patent Literatures

PTL 1: Japanese Unexamined Patent Application Publication No. 2006-260105

PTL 2: Japanese Unexamined Patent Application Publication No. 2010-287029

SUMMARY OF INVENTION

Technical Problem

In the autonomous mobile system shown in PTL 1, however, there is a problem that when a blind spot exists in a part of the level difference depending on arrangement of the distance image sensor, a border of the level difference is not able to be detected correctly. Thus, when the autonomous mobile system is turned abruptly or started abruptly, etc., operation for avoiding the level difference cannot be performed in time and the autonomous mobile system is in danger of falling into the level difference. Further, as the autonomous mobile system moves toward the level difference, a position which is detected as the level difference changes, so that it is impossible to perform travelling control and self-position recognition on a map with the position of the level difference as a mark, and working efficiency by using the autonomous mobile system is possibly deteriorated.

The present invention has been made in view of the aforementioned conventional problems, and is for providing a surrounding environment recognition device that detects a level difference which exists in a surrounding environment reliably and accurately to thereby enhance safety and further improve working efficiency, an autonomous mobile system using the same, and a surrounding environment recognition method.

Solution to Problem

In order to solve the aforementioned problems, a surrounding environment recognition device of the present invention is characterized by including:

a distance sensor;

a concave part judgment portion that judges at least a concave area lower than a floor surface based on distance data acquired from the distance sensor;

an overhead view data creation portion that performs coordinate conversion of the distance data with the floor surface as a reference to create overhead view data, and a correction processing portion that, in the overhead view data, corrects deviation of a position of a border between a concave area which is caused by a blind spot of the distance sensor and an area other than the concave area.

In one embodiment, the correction processing portion determines possibility/impossibility of correction of the deviation of the position of the border based on whether or not data judged by the concave part judgment portion is arranged in specific order in the overhead view data.

In one embodiment, the correction processing portion calculates a size of the blind spot of the distance sensor based on an attachment angle of the distance sensor, depth information of the concave area and distance data of the concave area, and determines a correction amount to the concave area.

An autonomous mobile system of the present invention is characterized in that,

It includes the surrounding environment recognition device and it moves while recognizing a movable area in a front side of an advancing direction.

A surrounding environment recognition method of the present invention is characterized by including:

measuring a floor surface by a distance sensor which is arranged in a frontward and obliquely downward direction to generate three-dimensional coordinate data of a floor surface reference, judging a floor surface area and a concave area lower than the floor surface based on the three-dimensional coordinate data and labeling the three-dimensional coordinate data to create overhead view data, and scanning the overhead view data, and when labels are arranged in a specific order, performing correction of deviation of a position of a border between a concave area which is caused by a blind spot of the distance sensor and an area other than the concave area.

Advantageous Effects of Invention

As above, the surrounding environment recognition device of the present invention is able to enhance accuracy of recognizing a surrounding environment by detecting a level difference reliably and accurately even when there is a blind spot.

Moreover, in the autonomous mobile system of the present invention, it is possible to prevent falling into a level difference by detecting the level difference reliably.

Moreover, the surrounding environment recognition method of the present invention is able to enhance accuracy of recognizing a surrounding environment by detecting a level difference reliably and accurately even when there is a blind spot.

BRIEF DESCRIPTION OF DRAWINGS

FIG. 8 is a view showing map information in the cleaning robot, in which (a) is a view showing map information stored in a map information memory, and (b) is a view showing map information in which edges are overwritten on (a);

FIG. 16 is a view showing extraction of a level difference area of the cleaning robot, in which (a) and (b) are views in the case where correction is not made; (a) is a view explaining integration by overwriting and updating of overhead view data and (b) is a view showing a level difference area acquired by overwriting and updating, (c) and (d) are views in the case where correction is made; (c) is a view explaining integration by overwriting and updating of overhead view data and (d) is a view showing a level difference area acquired by overwriting and updating.

DESCRIPTION OF EMBODIMENTS

Description will hereinafter be given specifically for the present invention with illustrated embodiments.

First Embodiment

Figure 1:
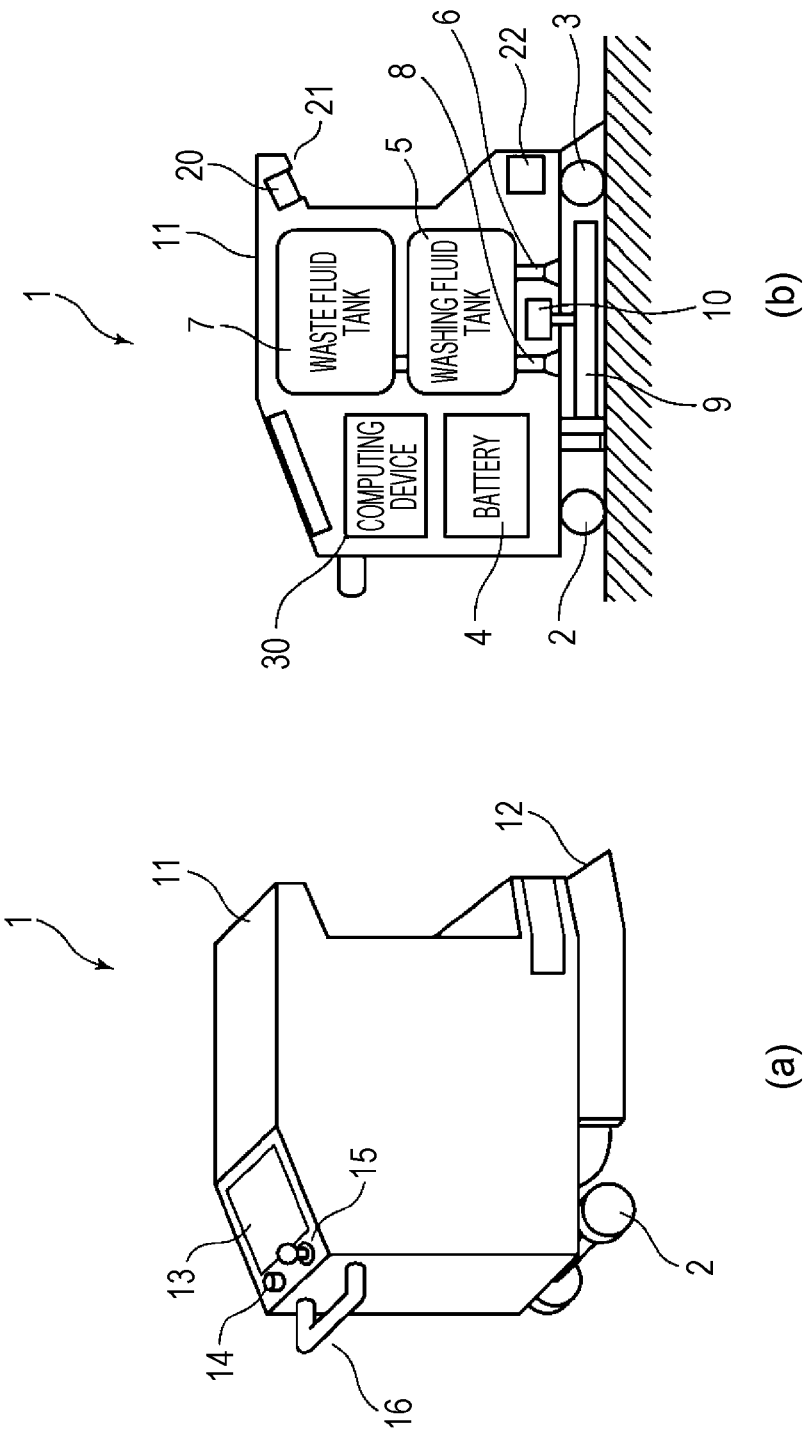
FIG. 1 shows a cleaning robot which is one embodiment of an autonomous mobile system using a surrounding environment recognition device in the present invention, in which (a) is an external view and (b) is a sectional view.

Description will be given for a first preferable embodiment of the present invention based on FIG. 1 to FIG. 8. First, an external view and a sectional view of a cleaning robot 1 which is one embodiment of an autonomous mobile system which includes a surrounding environment recognition device of the present invention are shown in FIGS. 1(a) and (b).

In FIGS. 1(a) and (b), 1 denotes the cleaning robot (autonomous mobile system), 2 denotes two drive wheels which are arranged on right and left of a bottom part of the cleaning robot 1, 3 denotes driven wheels which are attached to the bottom part of the cleaning robot 1 so as to rotate freely, and 4 denotes a battery which supplies operation electric power to the cleaning robot 1. Further, 5 denotes a washing fluid tank in which washing fluid is reserved, 6 denotes a washing fluid discharge portion which is coupled to the washing fluid tank 5, and both of them are connected by a cylindrical pipe and constitute a washing fluid discharge unit. Furthermore, 7 denotes a waste fluid tank in which waste fluid (including dust, dirt and the like) sucked into the cleaning robot 1 is reserved, 8 denotes a suction inlet which is provided on the bottom part of the cleaning robot 1 for sucking the waste fluid, and they are similarly connected by a pipe and constitute a waste fluid collection unit. 9 denotes a cleaning brush which is provided near the suction inlet 8 and is driven by a brush motor 10. 11 denotes a housing which covers a whole of these mechanisms, and 12 denotes a protection member for preventing the washing fluid from scattering and foreign matters from rolling in. In addition, an operation panel 13 for performing setting of various modes, switching of automatic travelling/manual travelling, switching of travelling/stop and the like, an emergency stop switch 14, that is, a switch for emergency stop for stopping in case of emergency, a travelling control lever 15 which determines a travelling direction at a time of manual travelling, and a grip 16 by which an operator supports a cleaning robot main body at a time of manual travelling, and the like are included.

Note that, a form of the cleaning robot 1 is not limited to a type of washing by using washing fluid as described above, and may be a cleaning robot of an aspect like a so-called domestic cleaner which includes a fan, a dust chamber, a suction port and the like.

Here, a basic advancing (travelling) direction of the cleaning robot 1 shown in FIGS. 1(a) and (b) is a right direction in the figures. "Basic" is because there is a possibility to travel (retract) to a left direction in the figures or move to a front or depth direction in the figures depending on situation or operation (also including remote operation) by a user. Note that, the basic advancing (travelling) direction is simply described as an advancing direction below.

A distance image sensor 20 is arranged in the cleaning robot 1. The distance image sensor 20 is attached at a position where an outside state is able to be grasped from an opening portion 21 provided in the housing 11.

The distance image sensor 20 is a distance image sensor of an infrared pattern light projection type, and has a projection optical system including a projection element of infrared light and an imaging optical system including an imaging element of infrared light inside thereof. By projecting and irradiating infrared light having a predetermined regular or irregular pattern (density pattern) to outside and imaging reflection light from an external object by the imaging element, it is possible to measure a distance to the object which is within a visual field range of the imaging optical system. A result of the distance measurement is output as a distance image (depth image) that the distance to the object which falls within the visual field range is represented as a grayscale value (density) of a pixel on an image. Note that, a sensor may be other types such as a time of flight (TOF) type and a stereo measurement type other than the infrared pattern light projection type as described above, as far as being capable of outputting a distance image.

Moreover, a laser range finder 22, which is mounted in the cleaning robot 1, is attached so that external measurement is allowed from a transparent window 21 provided in a front part of the housing 11.

Further, a computing device 30 which controls operation of the entire cleaning robot 1 is mounted inside the cleaning robot 1. The computing device 30 is electrically connected to respective components including the brush motor 10, the switches 14 and 15, and the distance image sensor 20, which are described above.

Figure 2:
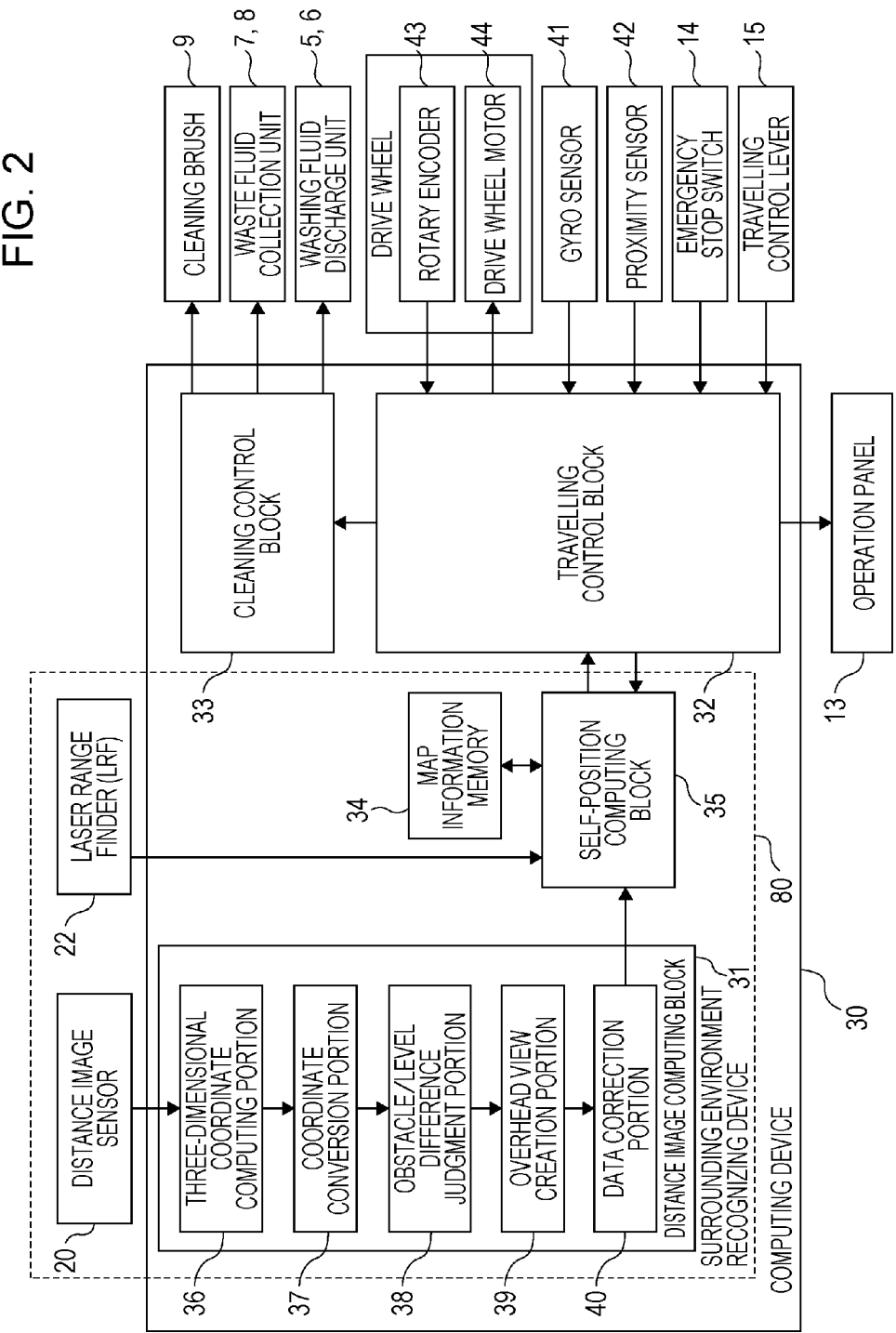
FIG. 2 is a block diagram showing an internal structure of the cleaning robot.
Figure 3:
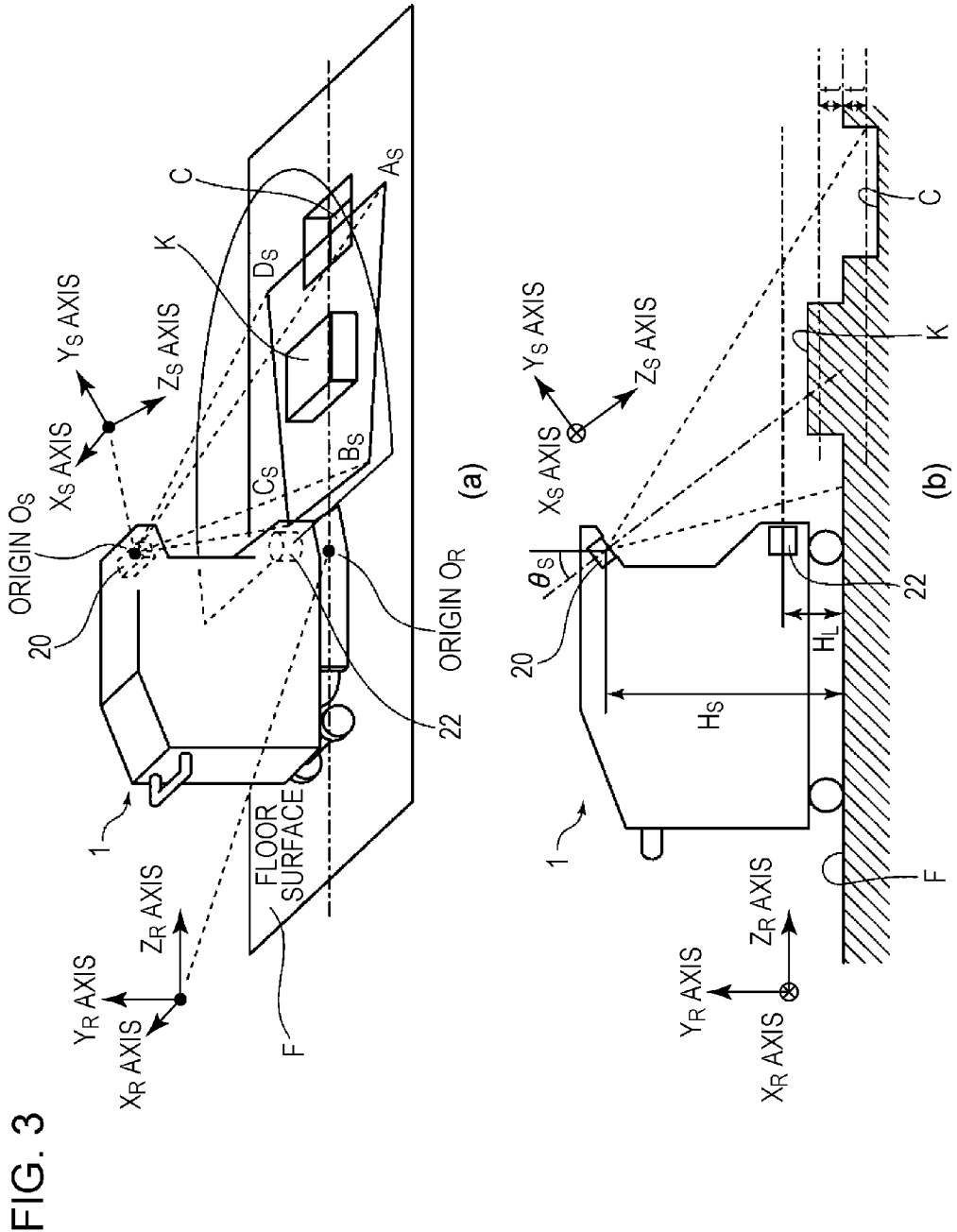
FIG. 3 is a view showing attachment positions and coordinate systems of a distance image sensor and a laser range finder of the cleaning robot, in which (a) is a perspective view and (b) is a sectional view.

A block diagram of the cleaning robot 1 is shown in FIG. 2. The computing device 30 is composed of a distance image computing block 31, a travelling control block 32, a cleaning control block 33, a map information memory 34 and a self-position computing block 35. Further, inside the distance image computing block 31, a three-dimensional coordinate computing portion 36, a coordinate conversion portion 37, an obstacle/level difference judgment portion 38 as one example of a concave part judgment portion, an overhead view creation portion 39 and a data correction portion 40 as a correction processing portion exist.

The distance image computing block 31 receives the distance image from the distance image sensor 20, performs processing of coordinate conversion or the like, and extracts obstacle/level difference information to transmit to the self-position computing block 35.

The travelling control block 32 grasps a movement distance and a current direction of the cleaning robot 1 based on information of a gyro sensor or a rotary encoder 43 attached to the drive wheel 2. This information about the movement distance and the direction (hereinafter referred to as "odometry information") is transmitted to the self-position computing block 35.

The self-position computing block 35 integrates the obstacle/level difference information output from the distance image computing block 31 and obstacle information acquired from the laser range finder 22. Further, the obstacle/level difference information is collated with map information about a shape of a surrounding environment stored in the map information memory 34 in advance and the odometry information transmitted from the travelling control block 32 to calculate at which position in a current map the cleaning robot 1 itself exists.

The distance image sensor 20, the distance image computing block 31, the laser range finder 22, the map information memory 34 and the self-position computing block 35 described above have roles as a "surrounding environment recognition device" 80 in the present invention. Further, the obstacle/level difference judgment portion 38, the overhead view creation portion 39 and the data correction portion 40 which exist inside the distance image computing block 31 correspond to the "concave part judgment portion", the "overhead view data creation portion", and the "correction processing portion" in the present invention, respectively. Note that, operation of the distance image computing block 31 and the self-position computing block 35 will be described below in detail.

The travelling control block 32 receives information about a self-position on the map and a distance to a surrounding obstacle or level difference from the self-position computing block 35, determines a travelling path so as to avoid the obstacle or the level difference, and actually controls the drive wheel motor 44 of the drive wheels 2. Further, when a signal from the operation panel 13, or control switches such as the travelling control lever 15 which determines a travelling direction at a time of manual travelling and the emergency stop switch 14 as the switch for emergency stop for stopping in case of emergency is received, necessary operation including emergency stop, changing of the travelling direction, etc. is performed accordingly. Information about such control is displayed on the operation panel 13 and updated in real time.

By receiving a command from the travelling control block 32, the cleaning control block 33 performs control for parts regarding cleaning such as operation start/stop switching of the cleaning brush 9, the waste fluid collection units 7 and 8 and the washing fluid discharge units 5 and 6.

Attachment positions of the distance image sensor 20 and the laser range finder 22 are shown in detail in FIG. 3(a). These distance image sensor 20 and laser range finder 22 are disposed at positions vertically separated from a floor surface F (travelling road surface) which is regarded as a cleaning target by the cleaning robot 1 by a predetermined distance. Specifically, the distance image sensor 20 is attached downward from a horizontal level in a front side of the advancing direction in a top part of the cleaning robot 1. In the present first embodiment, the distance image sensor 20 is attached at a position of height $H_s$=980 [mm] from the floor surface F with an angle $\theta_S$=20 [deg] to a vertical axis in an obliquely downward direction on a forward side of the advancing direction as shown in FIG. 3(b). Further, the laser range finder 22 is attached at a position of height $H_L$=350 [mm] from the floor surface F so as to be in parallel to the floor surface F, that is, horizontal. Actually, the attachment positions fluctuate somewhat by an assembling error or the like. Note that, the arrangement and the number of the distance image sensors 20 and the laser range finders 22 are not limited to the above and they are also able to be arranged in a plurality of pieces in parallel.

A scanning range, that is, a measurable range of the laser range finder 22 is a semicircular area at the height $H_L$ from the floor surface F as shown in FIGS. 3(a) and (b). However, a length in a radial direction of the semicircular area is displayed being reduced to be easily viewed in FIG. 3(a). Actually, it is measurable up to a considerably remote distance (5 to 10 m) as far as laser projection light reaches without being blocked. However, an obstacle whose height from the floor surface F is lower than the height $H_L$ and a level difference lower than the floor surface F are out of the scanning range of laser light and therefore not able to be detected. On the other hand, a measurable range of the distance image sensor 20 depends on an angle of view of the sensor. In the case of the distance image sensor 20 used in the present first embodiment, the angle of view in a horizontal direction is around 70 degrees and the angle of view in a vertical direction is around 55 degrees. The visual field range projected on the floor surface F is a range of a trapezoid $A_SB_SC_SD_S$ of FIG. 3(a) and a detectable range itself is narrower than that of the laser range finder 22, but, since height information is acquired in a two-dimensional manner, it is possible to detect an obstacle and a level difference within the range without fail. Accordingly, by using the two in combination, it is possible to detect an obstacle and a level difference in a wide range from a vicinity to a long distance in a balanced manner.

The distance image sensor 20 outputs a distance image which is a measurement result with a coordinate system of a distance image sensor reference. Definition of the coordinate system is shown in FIG. 3(a). With an optical center of the distance image sensor 20 as an origin $O_S$, a right-left direction, an up-down direction, a front-back direction, that is, an optical axis direction of the sensor when facing the advancing direction are taken on an $X_S$ axis (left direction is positive), a $Y_S$ axis (upward direction is positive), and a $Z_S$ axis (depth direction is positive), respectively. On the other hand, since the laser range finder 22 has the different attachment position and angle, coordinate systems of a sensor reference are also different from each other. Since there exists deviation between the distances represented by these coordinate systems and a distance measured along the floor surface F from the cleaning robot 1 main body, in order to obtain an accurate distance to a target object, it is necessary to perform coordinate conversion into a coordinate system of a floor surface reference and integrate two pieces of data of the distance image sensor 20 and the laser range finder 22.

Therefore, separately from an $X_SY_SZ_S$ coordinate system of a distance image sensor 20 reference, an $X_RY_RZ_R$ coordinate system which is a coordinate system of the cleaning robot 1 main body is defined. It is set that a foot of a perpendicular line to the floor surface F from a leading end of the cleaning robot 1 main body is origin $O_R$, the advancing direction of the cleaning robot 1 is a $Z_R$ axis, a normal line direction of the floor surface F is a $Y_R$ axis, and a direction perpendicular to the $Z_R$ axis and the $Y_R$ axis is an $X_R$ axis (left direction toward the advancing direction is positive).

Note that, in the present first embodiment, the advancing direction, that is, the $Z_R$ axis and the $Z_S$ axis which is the optical axis direction of the distance image sensor 20 are almost matched regarding to the right-left direction toward the advancing direction. This means that the distance image sensor 20 is not attached to be inclined to the floor surface F in the right-left direction and inclination of the distance image sensor 20 to the floor surface F is only inclination $\theta_S$ in the depth direction. Strictly, angle deviation occurs by an attachment error, but it is considered that the inclination angle in the right-left direction is still sufficiently smaller than the inclination angle $\theta_S$ in the depth direction.

Figure 4:
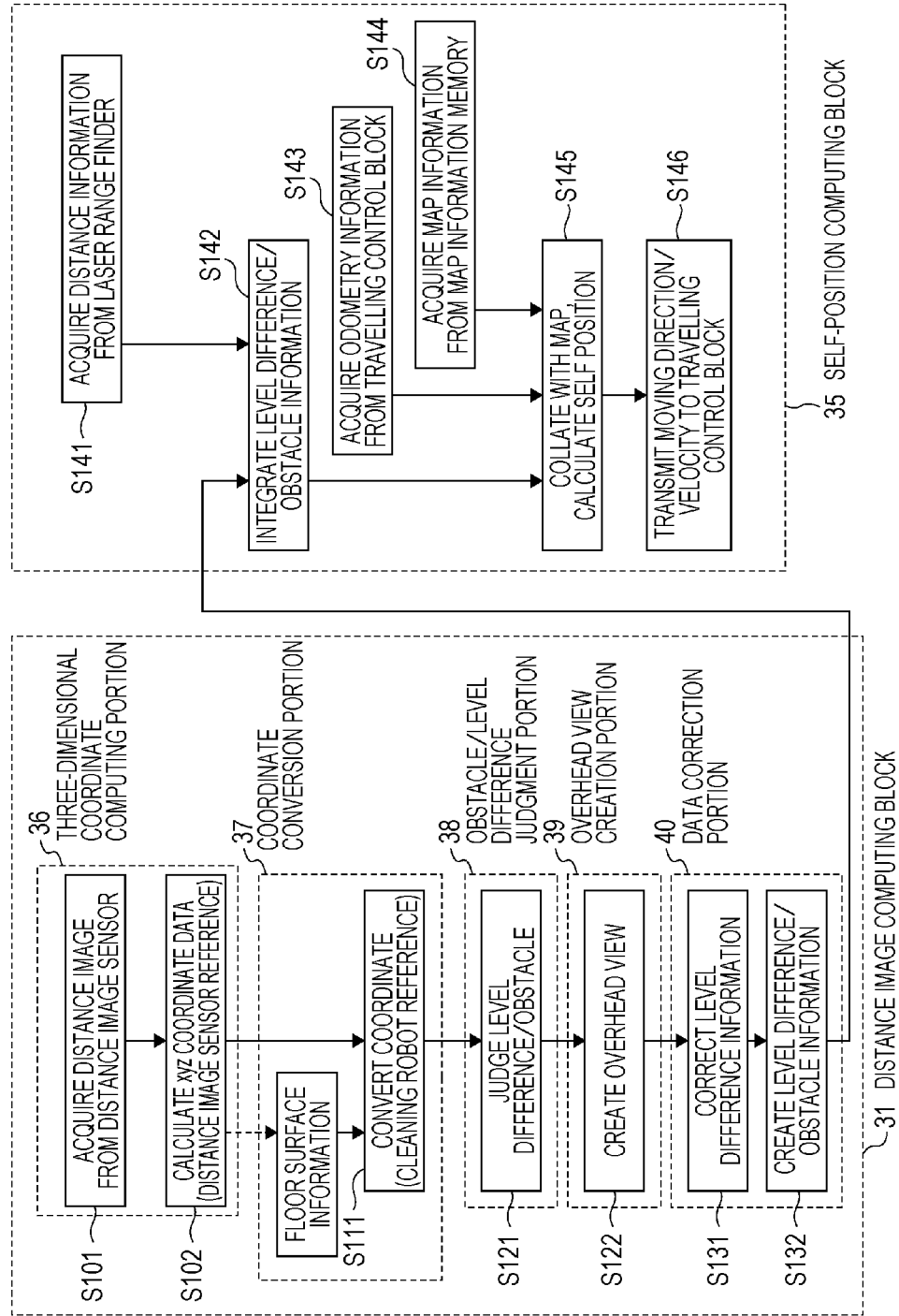
FIG. 4 is a flowchart of computing processing in the cleaning robot.
Figure 5:
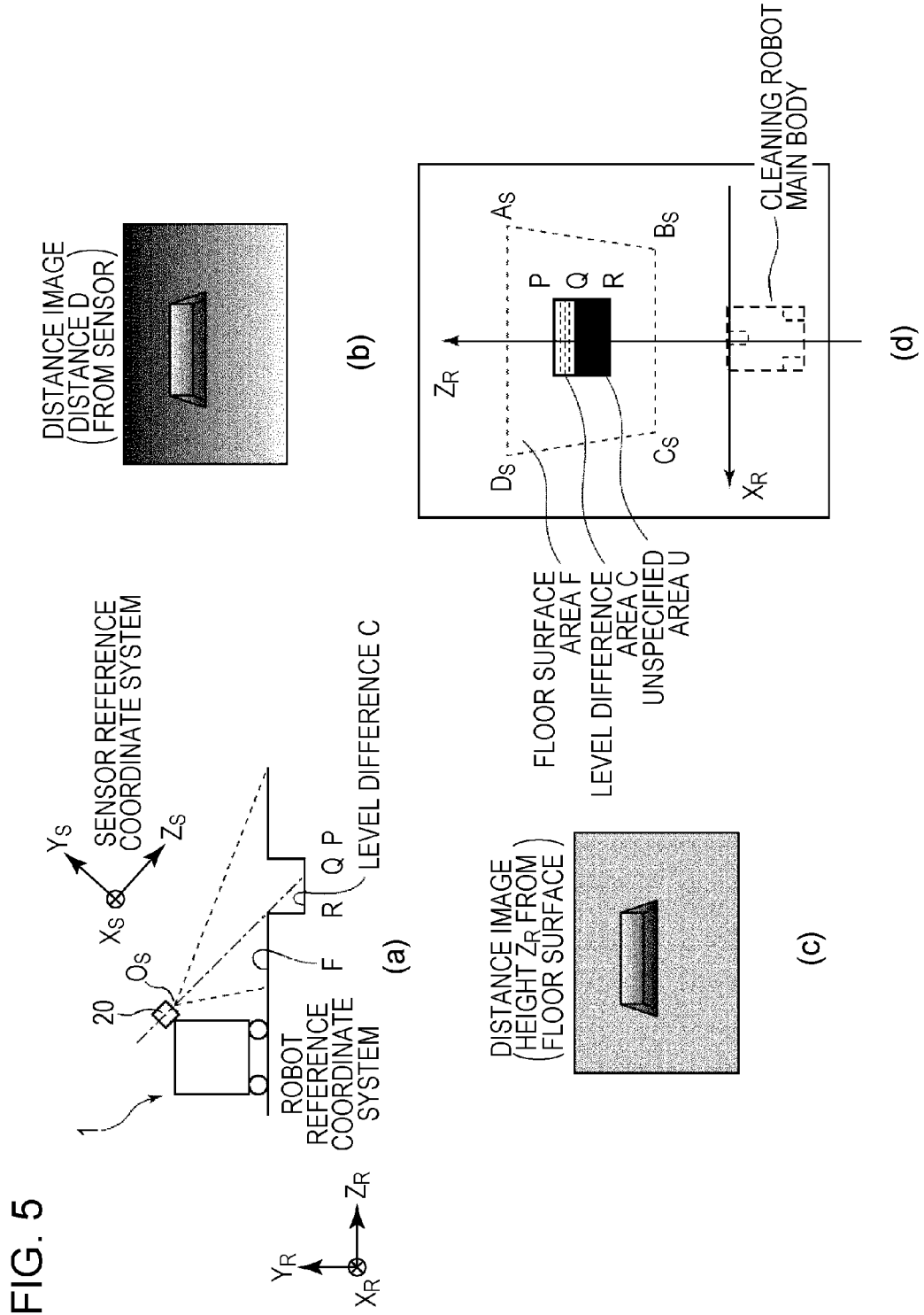
FIG. 5 is a view showing generation of a distance image and an overhead view of the cleaning robot, in which (a) is a schematic sectional view, (b) and (c) are views showing a distance image, and (d) is an overhead view.

The cleaning robot 1 in the present first embodiment applies coordinate conversion of the floor surface F reference to a distance image and performs processing for judging an obstacle or a level difference from information thereof in the distance image computing block 31 in the computing device 30, and is characterized by correcting an error of a measurement position of the level difference, which is caused by a blind spot at the time. Such computing will be described in detail below. FIG. 4 shows a flowchart of processing at the distance image computing block 31 and the self-position computing block 35.

The three-dimensional coordinate computing portion 36 in the distance image computing block 31 firstly acquires a distance image output from the distance image sensor 20 (step S101 of FIG. 4, the same is applied below). As shown in FIG. 5(a), when a concave area, that is, a level difference C exists on a part of the floor surface F, a distance image to be acquired is as shown in FIG. 5(b). This distance image, in which a distance D measured from the optical center $O_S$ of the distance image sensor 20 is shown by a density of a pixel, is displayed in white as the distance becomes small (close) and black as being large (far).

The three-dimensional coordinate computing portion 36 calculates three-dimensional coordinate data $(X_S, Y_S, Z_S)$ of the distance image sensor reference ($X_SY_SZ_S$ coordinate system) from data of this distance image (S102). Among the coordinate data, $Z_S$ is the distance D itself included in the distance image, and $X_S$ and $Y_S$ are able to be calculated from $Z_S$ by the triangulation principles when a focal length f of the optical system of the distance image sensor 20, a pixel pitch p, a pixel deviation amount c of the optical axis and a center of the imaging element and the like are found. In the present first embodiment, calibration is performed for the distance image sensor 20 and parameters thereof are obtained in advance. When a distance image is thereby acquired, the coordinate data of the distance image sensor reference $(X_S, Y_S, Z_S)$, that is, three-dimensional point group data is able to be acquired for all pixels included in the image.

The coordinate conversion portion 37 performs coordinate conversion for the three-dimensional point group data of the distance image sensor 20 reference by using floor surface information to convert into three-dimensional point group data represented by an $X_RY_RZ_R$ coordinate system of a cleaning robot main body reference (S111). The reason why converting into the coordinate system of the cleaning robot main body reference is to judge height from the floor surface F easily, and also to integrate with obstacle data acquired from the laser range finder 22 later.

The floor surface information is set in advance to an inside of the distance image computing block 31 based on the attachment position of the distance image sensor 20. For example, when the distance image sensor 20 is attached with an attachment angle $\theta_S$ at the height $H_S$ from the floor surface F as shown in FIG. 3(b), the coordinate conversion is realized by rotation by an angle $-\theta_S$ around the $X_R$ axis and parallel movement by $-H_S$ around the $Y_R$ axis.

However, due to causes such as inclination or undulation of a floor plane, oscillation of the cleaning robot 1 itself, a measurement error or chronological change of the distance image sensor 20, a positional relation between the floor surface F and the distance image sensor 20 fluctuates in terms of time and a space. In this case, since an error is causes by the fixed coordinate conversion as described above, processing for extracting points which constitute the floor surface F from the three-dimensional point group data of the distance image sensor 20 reference and obtaining height and an angle of the floor surface F therefrom in each case, that is, detection processing of the floor surface F becomes necessary. Such processing is performed for each frame for which a distance image is acquired, or at every constant frame interval or constant time interval, and a parameter of the floor surface F which is optimum at the time is obtained, and this is converted to the aforementioned rotational angle and translational movement amount. By performing such detection processing of the floor surface F and obtaining the optimum rotational angle and translational movement amount and then performing the coordinate conversion, it is possible to convert into the three-dimensional point group data of the cleaning robot main body reference.

Since $Y_R$ of the three-dimensional point group data of the cleaning robot main body reference acquired in this manner $(X_R, Y_R, Z_R)$ represents the height from the floor surface F as it is, when a magnitude of a value of $Y_R$ is represented with a grayscale tone, a distance image as shown in FIG. 5(c) is acquired. This distance image shows that the grayscale tone is almost uniform because the floor surface F is at a constant height and a part of a level difference lower than the floor surface F is represented by a darker tone.

After the aforementioned processing performed at the coordinate conversion portion 37, the obstacle/level difference judgment portion 38 as one example of the concave part judgment portion judges an obstacle and a level difference with respect to each point constituting the three-dimensional point group data $(X_R, Y_R, Z_R)$ depending on whether to be higher or lower than the floor plane (S121). Specifically, since $Y_R$ represents the height from the floor surface F as it is, by setting a threshold t which represents a first reference surface higher than the floor surface F, it is judged as a convex area K higher than the floor, that is, an "obstacle" when $Y_R$ is larger than t, as a concave area C lower than the floor surface, that is, a "level difference" when being smaller than a threshold −t which represents a second reference surface lower than the floor surface F, and as a floor surface area, that is, a "floor surface" when being between t and −t, as shown in FIGS. 3(a) and (b). The threshold t is determined in advance in consideration of sizes of concave and convex of the floor plane, a measurement error of the distance image sensor 20 and the like. In the present first embodiment, it is set as t=10 mm. Note that, absolute values of the thresholds representing the first reference surface and the second reference surface may be different.

Note that, as a method for judging the "level difference", the "obstacle" and the "floor surface", in addition to the method for using the thresholds for the height $Y_R$ from the floor surface F as described above, a method for using a slope as follows is also considered.

First, after applying a smoothing filer for removing burst noise to the three-dimensional point group data $(X_R, Y_R, Z_R)$, a slope between two points which are adjacent in the $X_R$ axis direction and the $Z_R$ axis direction.

When an absolute value of a slope, $$((\Delta Y_R/\Delta X_R)^2+(\Delta Y_R/\Delta Z_R)^2)^{1/2}$$

is a predetermined slope limit value or more, and a slope in the depth direction, $$\Delta Y_R/\Delta Z_R$$

is positive, it is regarded as a rising slope that the cleaning robot 1 is not able to climb over, and a point therebeyond, that is, on a side far from the cleaning robot 1 is judged as the "obstacle". Further, when the absolute value of the slope is the predetermined slope limit value or more and the slope in the depth direction is negative, it is regarded as a descending slope which is impossible to be climbed over, and a point therebeyond, that is, on a side far from the cleaning robot 1 is judged as the "level difference". By calculating climbing capability of the cleaning robot main body from a driving torque of the drive wheel motor 44 of the cleaning robot 1, quality of materials of the drive wheels 2 and the floor surface F etc., and based on them, the slope limit value is able to be determined.

Moreover, a judgment method by using both the thresholds about the height and the slope limit value is also considered.

A result of the judgment is added as label information to each of the three-dimensional point group data. To an area which is judged as none of the "level difference", the "obstacle" and the "floor surface" when a coordinate value is an abnormal value, etc., label information of "unspecified" is added. Note that, the labels are not limited to the aforementioned four types, and may be classified by further segmentalizing according to the height from the floor surface F or a new label such as "no-entry" may be added depending on whether a size is such that the cleaning robot main body is able to pass through. With this processing, in addition to the three-dimensional coordinate thereof, the three-dimensional point group data to which the "level difference", the "obstacle", the "floor surface", the "unspecified" and other labels are added is able to be acquired as to each pixel within the visual field range of the distance image sensor 20.

The overhead view creation portion 39 performs color-coding for the three-dimensional point group data to which the labels acquired by the aforementioned processing are added for each of label sections including the "level difference", the "obstacle", and the "floor surface" to create image data plotted in an $X_R$-$Z_R$ plane (flow S122 of FIG. 4). This image is shown in FIG. 5(d). This exactly corresponds to a view converted into a state of looking down in a direction of the floor surface F from directly above the cleaning robot 1 and is therefore referred to as a "overhead view" below. It is able to be seen that the level difference, that is, the concave area C which is in front of the cleaning robot 1 main body in FIG. 5(a) is measured by the distance image sensor 20 and displayed in FIG. 5(d). However, among points P, Q and R which exist on a bottom surface of the level difference in FIG. 5(a), when seen from the distance image sensor 20 of the cleaning robot 1, a part between P and Q is able to be seen, but a part between Q and R is a blind spot and therefore a distance thereof is not able to be measured. Thus, in FIG. 5(d), a part corresponding to the part between P and Q is displayed correctly with a "level difference" label color, but a part corresponding to the part between Q and R has no measurement data and is therefore displayed as an "unspecified" label color.

Note that, there exist two types of areas of the "unspecified" label, including an area where measurement data does not exist originally, that is, "measurement missing" and an area where measurement becomes impossible or measurement has an abnormal value due to noise at a time of acquiring the distance image etc., that is, "measurement abnormality". However, for example, when a certain point is measured as a point which is significantly deviated from a true coordinate value of the point due to measurement abnormality, a point corresponding to the true coordinate value results in measurement missing. Therefore, it is not able to judge whether a certain area of the "unspecified" label is caused by the "measurement missing" or the "measurement abnormality" from the overhead view.

In the present first embodiment, the overhead view is created as an image which is able to be displayed actually for facilitating explanation, but it is not always necessary to provide such a configuration. It is able to be replaced with generation of not the overhead view image but numerical data equivalent thereto, that is, "overhead view data" inside the computing device, when it is not necessary to confirm by displaying on a screen. In such a case as well, an effect equivalent to the present first embodiment is achieved by adding labels to respective elements of this "overhead view data" and further performing processing same as one described below.

Figure 6:
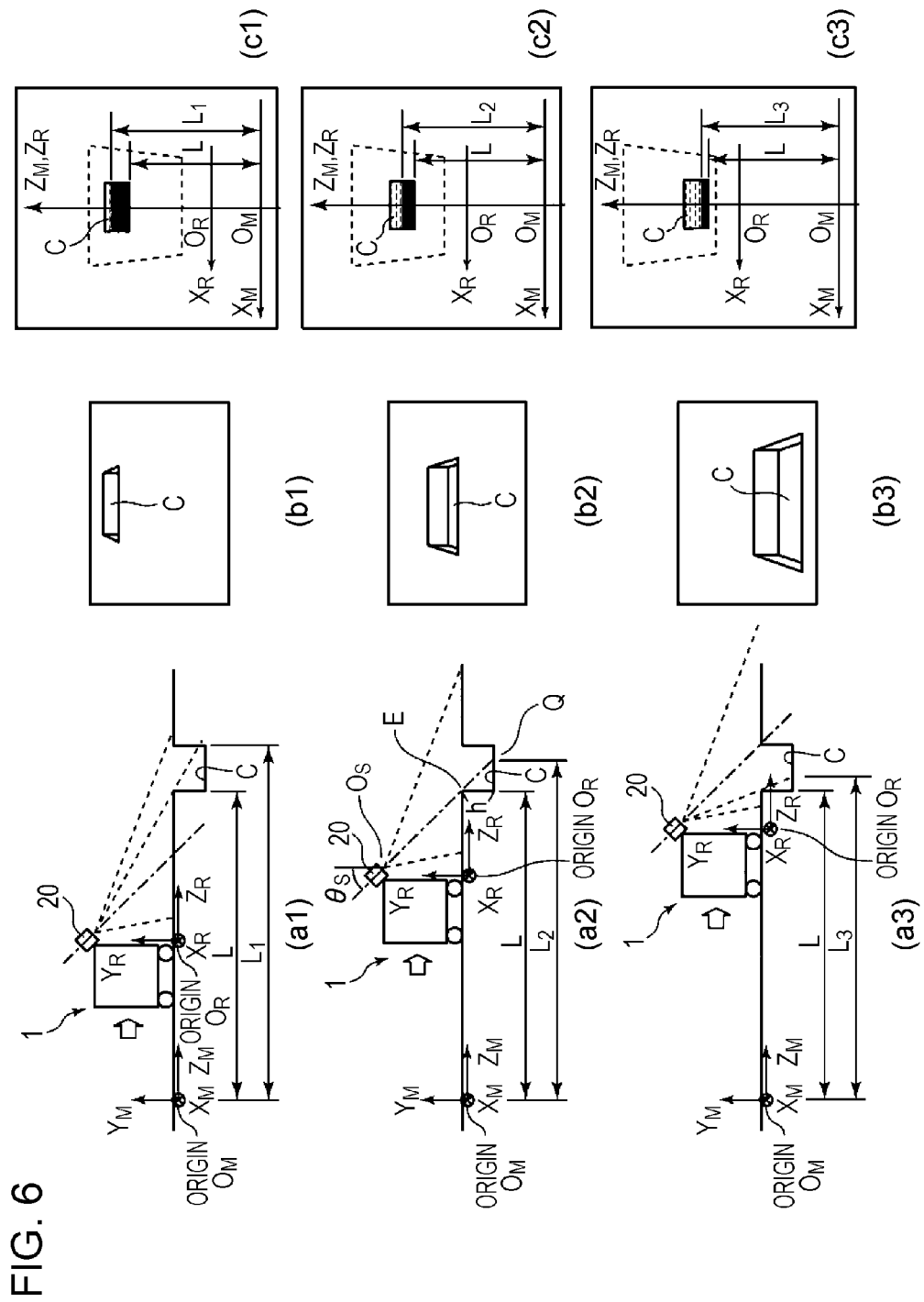
FIG. 6 is a view showing a visual difference according to a distance to a level difference and occurrence of a measurement error in the cleaning robot, in which (a1), (a2) and (a3) are schematic sectional views, (b1), (b2) and (b3) are views showing distance images, and (c1), (c2) and (c3) are overhead views.
Figure 7:
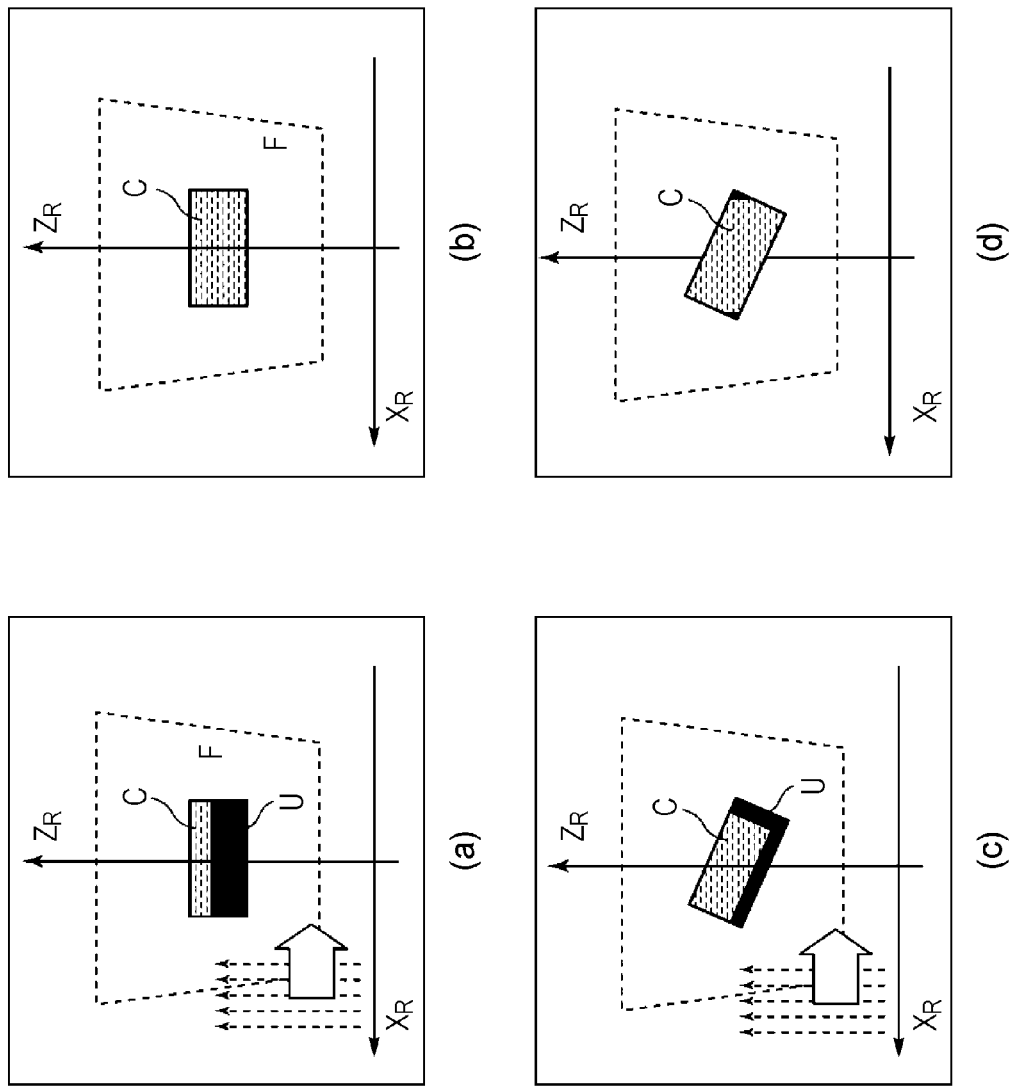
FIG. 7 is a view showing a method for correcting a level difference edge in the cleaning robot, in which (a), (b), (c) and (d) are overhead views.

Here, situations when the cleaning robot becomes close to the level difference C shown in FIG. 5(a) gradually are shown in FIGS. 6(a1), (a2) and (a3). First, FIG. 6(a1) is a view showing a positional relation of a state where the cleaning robot is relatively away from the level difference C, FIG. 6(b1) is an image showing how it is seen at the time when a viewpoint is set at the distance image sensor 20, and FIG. 6(c1) is an overhead view acquired by performing color-coding the three-dimensional point group data to which level difference/obstacle information is added to plot in the $X_R$-$Z_R$ plane in the same manner as FIG. 5(d). Next, FIG. 6(a2) is a view showing a positional relation of a state where the cleaning robot 1 becomes slightly close to the level difference C, and FIGS. 6(b2) and (c2) are views same as FIGS. 6(b1) and (c1) in that state. Further, FIG. 6(a3) is a view showing a positional relation of a state where the cleaning robot 1 further becomes close to the level difference C, and FIGS. 6(b3) and (c3) are views same as FIGS. 6(b1) and (c1) in that state.

These FIGS. 6(a1), (a2), (a3), (c1), (c2) and (c3) show a coordinate system $X_M Y_M Z_M$ in which a certain position $O_M$ on the floor surface F is fixed as an origin, separately from the coordinate system $X_R Y_R Z_R$ of the cleaning robot main body reference (which moves with the cleaning robot main body) so as to be easily understood. In this fixed coordinate system, a distance from the origin $O_M$ to an edge on a side of the level difference C close to the cleaning robot 1 is L.

As the cleaning robot 1 main body becomes close to the level difference C from FIG. 6(a1) to (a2), and further to (a3), the positional relation between the distance image sensor 20 and the level difference C changes, and therefore a blind spot of the level difference C viewed from the distance image sensor 20 also changes. This is clear also from the images showing situations of the change of FIGS. 6(b1), (b2) and (b3). As a result of this, the overhead views change like FIGS. 6(c1), (c2) and (c3). On these overhead views, the distance from the origin $O_M$ of the floor surface-fixed coordinate system $X_M Y_M Z_M$ to a front end edge of the level difference area C is $L_1$ in FIG. 6(c1), $L_2$ in FIG. 6(c2) and $L_3$ in FIG. 6(c3), which shows that they change as the cleaning robot 1 becomes close to the level difference C. This means that an edge position of the level difference C that the distance image sensor 20 recognizes changes with the movement of the cleaning robot 1.

The considerations above show that even though the distance to a true edge position of the level difference C (when measured from the origin $O_M$) is L, an edge position which is measured has a value larger than (far from) L due to influence of the blind spot and this value approaches L as being close to the level difference C. That is, as the cleaning robot 1 becomes close to the level difference C, the edge position is to approach gradually compared with first measurement.

In an autonomous mobile robot as an example of the autonomous mobile system (for example, a cleaning robot or the like), it is necessary to grasp a position of a surrounding level difference accurately for travelling safely in an unmanned state. Even when a position of an edge of a level difference which is detected fluctuates during movement, normally, it is possible to avoid falling by amending a moving velocity and a moving direction by the travelling control block in each case. However, it is considered that the level difference suddenly appears in a visual field range from an area which has been out of the visual field range of the distance image sensor till then, including a case of turning abruptly, starting abruptly, etc., and in such a case, there is a possibility that operation for avoiding cannot be performed in time. Though double and treble fall prevention measures are taken for the autonomous mobile robot by providing a floor surface detection sensor or the like in a lower part of a housing individually other than a surrounding environment detecting device like the distance image sensor, etc., when a position measurement error due to a blind spot as described above still occurs frequently, it is impossible to eliminate a possibility that behavior becomes unstable because the floor surface detection sensor reacts excessively, etc.

In particular, in the cleaning robot 1 like the present first embodiment, there is a case where cleaning is performed by approaching a position of the edge of the level difference C as close as possible, so that it is required to perform detection of the position of the level difference C especially with high accuracy. Accordingly, when even a little position measurement error for the edge of the level difference C is caused, a danger that the cleaning robot 1 main body falls into the level difference C occurs.

The cleaning robot 1 of the present first embodiment is characterized in that, correction of the position of the level difference C is performed by the data correction portion 40 as the correction processing portion which is arranged in a subsequent stage of the overhead view creation portion 39 for preventing troubles as described above (flow S131 of FIG. 4). Correction procedure by the data correction portion 40 is shown in FIGS. 7(a), (b), (c) and (d).

In the same manner as FIG. 5(d), it is assumed that a "overhead view" acquired by performing color-coding of the three-dimensional point group data to which level difference/obstacle information is added to plot in the $X_R$-$Z_R$ plane is as shown in FIG. 7(a), and an area U to which the "unspecified" label is applied due to a blind spot exists. At this time, the data correction portion 40 scans distance data in a positive direction of $Z_R$ (from a side close to the cleaning robot 1 to a side far therefrom, direction of a dotted-line arrow) and searches a part where the labels are arranged in order of "floor surface (or obstacle)"-"unspecified"-"level difference". When such a part is found, for a point to which the "unspecified" label is added, the "level difference" label is substituted. Thereby, an overhead view as shown in FIG. 7(b) is acquired. It is found that influence by the blind spot is eliminated, and a border between the floor surface F and the level difference C, that is, the edge of the level difference C is corrected to a correct position.

Note that, also in the case like FIG. 7(c) that the level difference C exists being arranged to be inclined to the cleaning robot 1 main body, an overhead view which has been corrected as shown in FIG. 7(d) is acquired by performing the same processing. In this case as well, the edge of the level difference C is corrected to an almost correct position.

Note that, as described before, as the "unspecified" label area, one which is caused because of measurement noise or the like exists in addition to one which is caused because of a blind spot. Therefore, for example, simply by substituting the "unspecified" label area with the "level difference" label area in the overhead view in the same way, it is considered that an event that an area which is not a level difference is erroneously judged as a level difference occurs. Against this, in the cleaning robot 1 of the present first embodiment, since correction is performed only when the labels are arranged in the aforementioned predetermined order, even in a case where the unspecified area caused by impossible measurement due to noise or the like exists, by clearly distinguishing it with the unspecified area caused by a blind spot, it is possible to perform correction of a part of a blind spot part reliably.

A correction amount for this blind spot part is carried out as follows by the data correction portion 40 as the correction processing portion. Description will be given specifically with reference to FIG. 6(*a*2). As shown in FIG. 6(*a*2), when an attachment angle which also includes a swing angle of the image distance sensor 20 as the distance sensor at the time of scanning (inclination angle to a vertical plane) is $\theta_S$, depth information of the level difference C as the concave area is h, and apparent distance data from the origin $O_M$ to the level difference C is $L_2$, and a true distance from the origin $O_M$ to the edge of the level difference C is L, $$L_2 - L = h \cdot \tan \theta_S,$$

so that the correction amount is $h \cdot \tan \theta_S$, and by decreasing the correction amount $h \cdot \tan \theta_S$ from the apparent distance data $L_2$ to the level difference C, the true distance L from the origin $O_M$ to the edge of the level difference C is calculated as $$L = L_2 - h \cdot \tan \theta_S.$$

Here, h and $\tan \theta_S$ are able to be calculated as follows. In FIG. 6(*a*2), an end point on a floor surface side of a front-side edge of the level difference is E and an intersection of a straight line $O_S E$ with the floor surface is Q. Since E and Q are points which are seen from the distance image sensor (not in a blind spot), three-dimensional coordinates of the distance image sensor reference ($X_S Y_S Z_S$ coordinate system) are able to be acquired. The three-dimensional coordinates of E, Q and the origin $O_S$ of the distance image sensor are converted into the robot main body reference ($X_R Y_R Z_R$ coordinate system) and the acquired three-dimensional coordinate values are set as ($X_E, Y_E, Z_E$), ($X_Q, Y_Q, Z_Q$), and ($X_{OS}, Y_{OS}, Z_{OS}$), respectively. In this case, h and $\tan \theta_S$ are obtained as $$h = Y_E - Y_Q, \text{ and}$$

$$\tan \theta_S = (Z_E - Z_{OS})/(Y_E - Y_{OS}).$$

Thereby, the correction amount $h \cdot \tan \theta_S$ is able to be calculated.

To a specific level difference C, h, that is, the depth of the level difference is invariable, but $\tan \theta_S$ varies as the cleaning robot moves. Therefore, the correction amount $h \cdot \tan \theta_S$ needs to be calculated again in each case.

Further, by referring to the correction amount $h \cdot \tan \theta_S$ described above, when a length of the "unspecified" label area is longer or shorter than a proper length, the data correction portion 40 is able to judge as being not the "unspecified" label area which is caused by a blind spot not to perform correction. Thereby, even when the "unspecified" label area caused by impossible measurement due to noise or the like exists, it is possible to detect a size of the blind spot accurately and perform correction with high accuracy.

Note that, as a method for performing correction of positional deviation of a level difference caused by a blind spot by generating an overhead view from three-dimensional information in a moving body, PTL 2 (Japanese Unexamined Patent Application Publication No. 2010-287029) is known.

Figure 14:
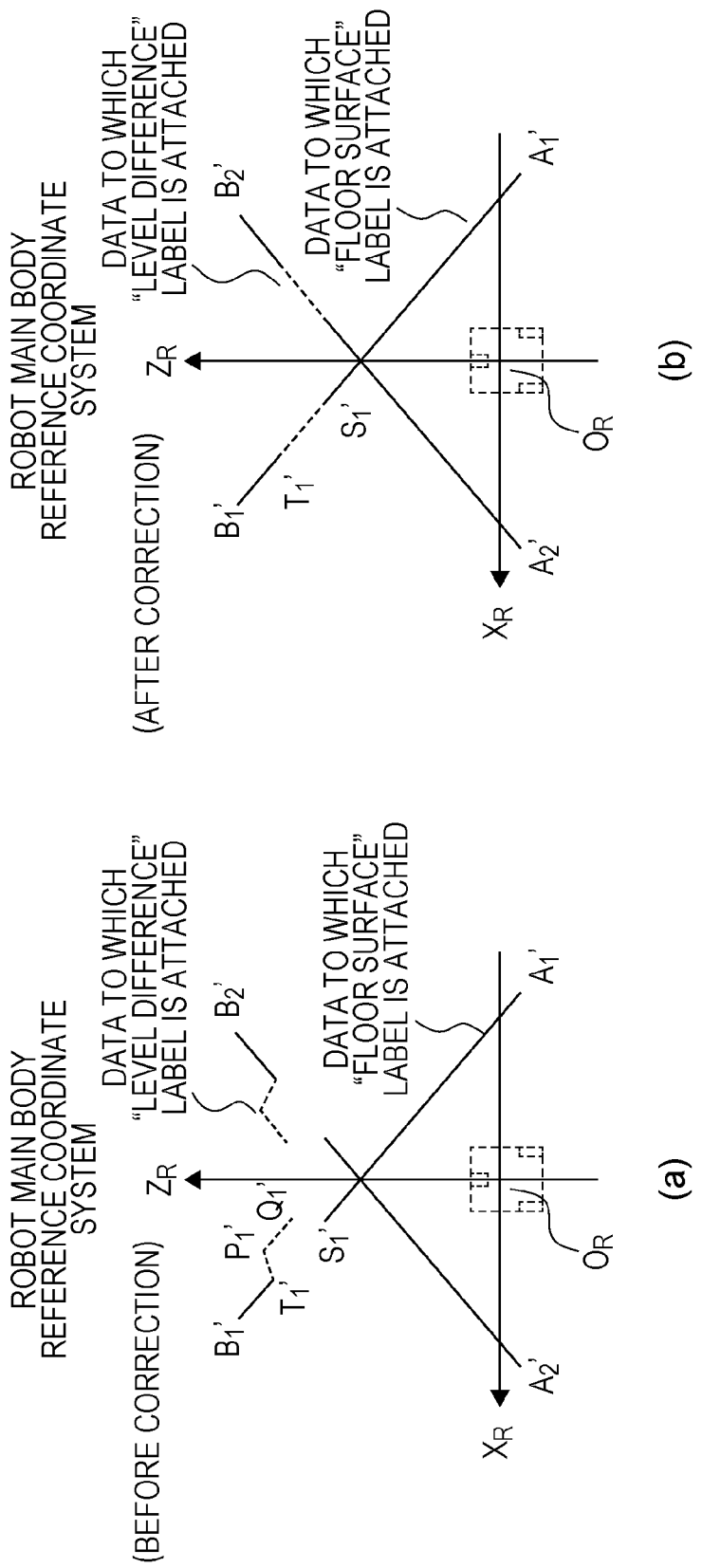
FIG. 14 is a view showing generation and correction of an overhead view of the cleaning robot, in which (a) is an overhead view before correction and (b) is an overhead view after correction.

In PTL 2, based on three-dimensional information acquired by using a stereo camera attached to a moving body, an overhead view seen from above the moving body is created. In a case where a blind spot exists in a part of a frontward recess (level difference) when viewed from the stereo camera, an area where a measurement point does not exist, which is caused by the blind spot, is generated on the overhead view, so that this area where the measurement point does not exist is judged as a dangerous area (refer to FIG. 14 and FIG. 15 of the same literature).

In PTL 2, however, since the area where the measurement point corresponding to the unspecified area in the present first embodiment does not exist is judged as the dangerous area in the same way, even when a part of a floor surface serves as the unspecified area temporarily due to noise or the like, for example, there is a possibility that this area is erroneously judged as the dangerous area so that moving to this area is not allowed.

On the other hand, in the present first embodiment, since correction is performed with the procedure described before only when the labels applied to the three-dimensional point group data are arranged in the specific order, it is possible to distinguish the unspecified area due to noise or the like and the unspecified area caused by a blind spot clearly and perform correction of the edge position of the level difference reliably. Further, a correction amount of a part of the blind spot in the level difference is calculated based on information of the depth of the level difference and the attachment angle of the distance sensor included in distance data and correction is performed for that part, thus making it possible to perform correction of a position of the level difference accurately compared with the method of PTL 2.

Further, the area where a measurement point does not exist is only judged as a dangerous area and information on the edge position of the level difference is not corrected in PTL 2, while in the present first embodiment, by performing correction also for the edge position of the level difference, it is possible to acquire the correct edge position of the level difference. This makes it possible to use edge information after the correction as a key of self-position recognition, and therefore accuracy of the self-position recognition on a map is enhanced, thus making it possible to enhance reliability of travelling based on map information of the autonomous mobile system.

The data correction portion 40 extracts information on a level difference and an obstacle close to the cleaning robot 1 main body from the corrected overhead view, and transmits it to the self-position computing block 35 as level difference/obstacle information (flow S132 of FIG. 4).

A format of the level difference/obstacle data is able to be converted into an arbitrary format so as to be easily processed by the travelling control block 32 later. A coordinate system of the data is also able to transmitted being remained as the $X_R Y_R Z_R$ orthogonal coordinate system of the cleaning robot reference and is also able to be converted into a polar coordinate (R–θ coordinate system). In addition to a method for converting all the obstacles and level differences which are detected into data, methods for performing thinning and interpolation of data and noise removal processing, or extracting only data of an obstacle and a level difference closest to the cleaning robot 1 main body are also considered.

As described before, the self-position computing block 35 acquires obstacle information from the laser range finder 22 (S141). Thereafter, the obstacle/level difference information output from the distance image computing block 31 is integrated with the obstacle information acquired from the laser range finder 22 (S142). For example, when in front of an obstacle A which is measured by the laser range finder 22, a different obstacle B which is measured by the distance image sensor 20, it is possible to integrate data so that data of the closer obstacle B has priority.

Then, the self-position computing block 35 acquires odometry information from the travelling control block 32 (S143).

Further, the self-position computing block 35 takes out map information about a shape of a surrounding environment stored in the map information memory 34 (S144). One example of the map information stored in the map information memory 34 is shown in FIG. 8(*a*). As shown in FIG. 8(*a*), a floor surface F, an obstacle, a level difference and a no-entry area are registered being distinguished as to an entire area in which the cleaning robot 1 performs cleaning. The cleaning robot 1 is controlled by the travelling control block 32 so as to clean only a part of the floor surface F which is set in this map information.

The self-position computing block 35 collates the obstacle/level difference information, the map information and the odometry information which are acquired by the aforementioned processing, and performs calculation that at which position in the current map the cleaning robot 1 itself exists (S145). When the self-position computing block 35 performs computing of the self-position, as shown in FIG. 8(*b*), an edge based on the obstacle information detected by the laser range finder 22 (thick solid line) and an edge based on the obstacle/level difference information detected by the distance image sensor 20 (thick dotted line) are overwrite-displayed on the map. In order to reduce inconsistency between an edge of the obstacle or the level difference registered on the map in advance and the edge which is detected actually as small as possible and reduce a difference from the odometry information as small as possible, self-position estimation is performed with predetermined algorithm. As such algorithm for the self-position estimation, methods of a particle filter, an extended Kalman filter and the like are known.

In this self-position estimation processing, when there is a measurement error of the level difference edge due to a blind spot of the distance image sensor 20, an error occurs in a self-position estimation value and it becomes impossible to perform travelling accurately along the map information. Against this, the cleaning robot 1 of the present first embodiment is able to acquire the correct position of the level difference by performing the correction of the level difference edge described above, and therefore able to perform the self-position estimation accurately and perform efficient travelling control based on the map information.

The self-position computing block 35 transmits self-position information in the current map acquired as a result of the calculation to the travelling control block 32 (S146). In the travelling control block 32, several travelling patterns which are defined in advance are registered and one of them is selected. As the travelling patterns, there are "travelling until reaching one circle in an area along a wall", "travelling so as to fill in an inner area surrounded by the wall", "travelling while changing direction in a random manner by a predetermined distance or time", and the like, for example. The travelling control block 32 collates the self-position information and the travelling pattern which is set and determines the direction to move in and the moving velocity to perform travelling control of the cleaning robot.

As described above, in the cleaning robot 1 of the present first embodiment, even when there is a blind spot, by detecting the level difference C reliably and accurately, it is possible to enhance recognition accuracy of a surrounding environment and prevent falling into the level difference C.

Further, even when the unspecified area which is caused when measurement becomes impossible due to noise or the like exists and is mixed with the unspecified area caused by a blind spot at a time of measuring a distance image, it is possible to detect a size of the blind spot accurately for correction. Further, by performing travelling control with a position of a level difference as a mark and self-position recognition on a map, it is possible to improve working efficiency when performing cleaning operation with autonomous movement.

Second Embodiment

Figure 9:
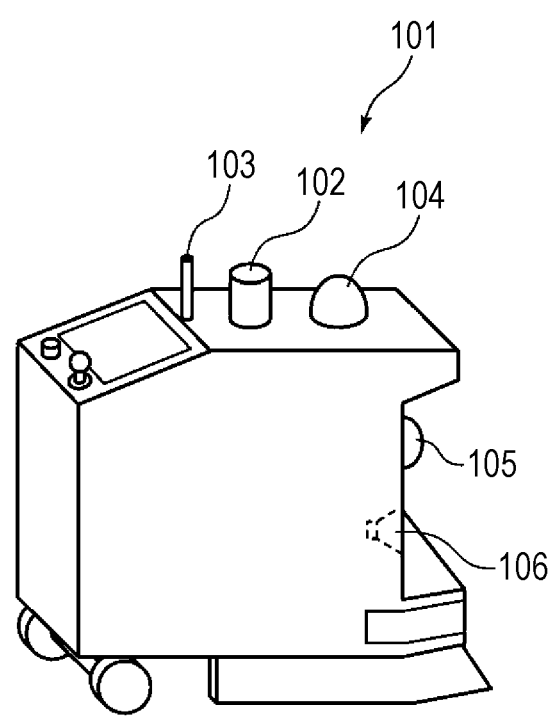
FIG. 9 is an external view of a monitoring robot which is one embodiment of the autonomous mobile system using the surrounding environment recognition device in the present invention.

Next, description will be given for a second embodiment in which the surrounding environment recognition device of the present invention is applied to a robot for monitoring as one example of the autonomous mobile system by using FIG. 9. Same reference numerals are assigned to same parts as those of the first embodiment and description thereof will be omitted.

A monitoring robot 101 which is an autonomous mobile robot is mounted with, in the same manner as the first embodiment, a surrounding environment recognition device (which is not shown, but has exactly the same configuration and functions as the surrounding environment recognition device 80 of the first embodiment) using a distance image sensor of the infrared pattern light projection type (which is not shown, but has exactly the same configuration and functions as the distance image sensor 20 of the first embodiment). The functions related to cleaning, including the cleaning brush, the washing fluid tank, and the waste fluid tank, are omitted, and a display lamp 102 for notifying the surroundings of a state, an antenna 103 for performing data communication wirelessly with an external terminal, an omnidirectional camera 104, an illumination lamp 105 and a speaker 106 are provided instead. The omnidirectional camera 104 records conditions of 360 degrees around the monitoring robot at all times to transmit to a terminal for managing (not shown) which exists at a remote site wirelessly via the antenna 103. A manager of the terminal for managing confirms received image data of the omnidirectional camera 104 and checks whether or not there are abnormalities. When the manager is absent, it is also possible to set to a mode for performing monitoring of abnormalities automatically by analyzing the image data of the omnidirectional camera 104 inside a main body of the monitoring robot 101.

The monitoring robot 101 performs monitoring while moving at all times in a monitoring area which is set in advance in an office building in a time zone in which no one is present such as at night. At this time, it moves in a passage in the monitoring area while referring to map information stored in the monitoring robot 101 main body in advance. In the same manner as the first embodiment, self-position recognition and avoiding of a level difference and an obstacle are performed based on information measured by the distance image sensor.

When some abnormalities are found, it rushes to a site, turns on the illumination lamp 105 and takes an image of the site to transmit to the manager wirelessly. When a suspicious person exists, it is possible to cause the speaker 106 to emit a warning sound or to sound a message for urging leaving.

As above, in the present second embodiment, by operating the monitoring robot 101 in the office building, it is possible to perform monitoring safely without manual operation. By using the surrounding environment recognition device of the present invention, even when there exists a level difference or the like near the passage in the monitoring area, it is possible to recognize an edge of the level difference regardless of a blind spot correctly and prevent falling. Further, when travelling in the monitoring area while recognizing a self-position based on the map information, by using edge information of the level difference after correction as a mark of the self-position recognition, it is possible to enhance recognition accuracy and improve efficiency of moving in the monitoring area.

Third Embodiment

Figure 10:
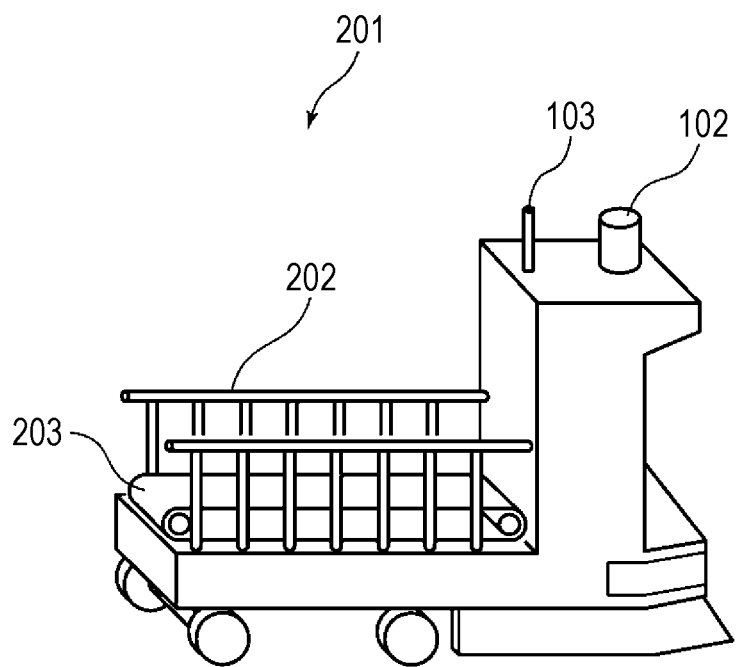
FIG. 10 is an external view of an automatic conveying robot which is one embodiment of the autonomous mobile system using the surrounding environment recognition device in the present invention.

Subsequently, description will be given for a third embodiment in which the surrounding environment recognition device of the present invention is mounted in an automatic conveying robot for a factory by using FIG. 10. Same reference numerals are assigned to same parts as those of the first and second embodiments and description thereof will be omitted.

An automatic conveying robot 201 which is one example of an autonomous mobile system is mounted with, in the same manner as the first and second embodiments, a surrounding environment recognition device (having exactly the same configuration and functions as the surrounding environment recognition devices of the first and second embodiments) using a distance image sensor of the infrared pattern light projection type. The functions related to cleaning, including the cleaning brush, the washing fluid tank, and the waste fluid tank, are omitted, and a cargo loading portion 202 for moving with a cargo being loaded is included instead. The cargo loading portion 202 has a conveyor belt 203 attached to a bottom surface thereof and has a structure allowing automatic loading and unloading of a cargo. Further, in the same manner as the second embodiment, a display lamp 102 for notifying the surroundings of a state and an antenna 103 for performing data communication wirelessly with an external terminal are provided.

The automatic conveying robot 201 is on standby at all times at a cargo collection terminal which is provided in a factory, and when a cargo arrives, stores it on the loading portion 202 by using the conveyor belt 203 on the bottom surface. At the same time, information on content and an address for delivery of the cargo is transmitted to an automatic conveying robot 201 main body from a terminal of the cargo collection terminal wirelessly.

After loading of all cargos is completed, the automatic conveying robot 201 starts movement and moves in a passage in the factory while referring to map information stored in the robot main body in advance. In the same manner as the first embodiment, self-position recognition and avoiding of a level difference and an obstacle are performed based on information measured by the distance image sensor. When arriving at a distribution point which is a delivery destination, the information on the content and a delivery source of the cargo is transmitted to a terminal of the distribution point wirelessly. Then, unloading of the cargo is performed by using the conveyor belt 23 on the bottom surface.

When the unloading is completed, movement to a delivery destination of a next cargo is started. When unloading of all cargos to destinations is completed in this manner, it returns to the original cargo collection terminal while referring to the map information.

By operating such automatic conveying robots 201 in a plurality of pieces in the factory, it is possible to convey a large amount of cargos safely without manual operation in the factory. By using the surrounding environment recognition device of the present invention, even when there exists a level difference or the like near the passage in the factory, it is possible to recognize an edge of the level difference regardless of a blind spot correctly and prevent falling. Further, when travelling in the factory while recognizing a self-position based on the map information, by using edge information of the level difference after correction as a mark of the self-position recognition, it is possible to enhance recognition accuracy and improve efficiency of moving in the factory.

Note that, though the distance image sensor 20 of the infrared pattern light projection type is used as the distance sensor used for the surrounding environment recognition device in the first to third embodiments above, a distance image sensor of other type, including a stereo type or a TOF type, is also usable. In the case of the distance image sensor of the stereo type, with respect to right and left images acquired from right and left cameras which are in a stereoscopic arrangement, a disparity is calculated by a method of corresponding point search or the like. It is possible to obtain a distance to a target object from a value of the disparity by triangulation principles.

Fourth Embodiment

Subsequently, description will be given for a fourth embodiment in which laser range finders (LRFs) are used as the distance sensors instead of the distance image sensor of the infrared pattern light projection type by using FIG. 11 to FIG. 16. Same reference numerals are assigned to same parts as those of the first embodiment and description thereof will be omitted.

Figure 11:
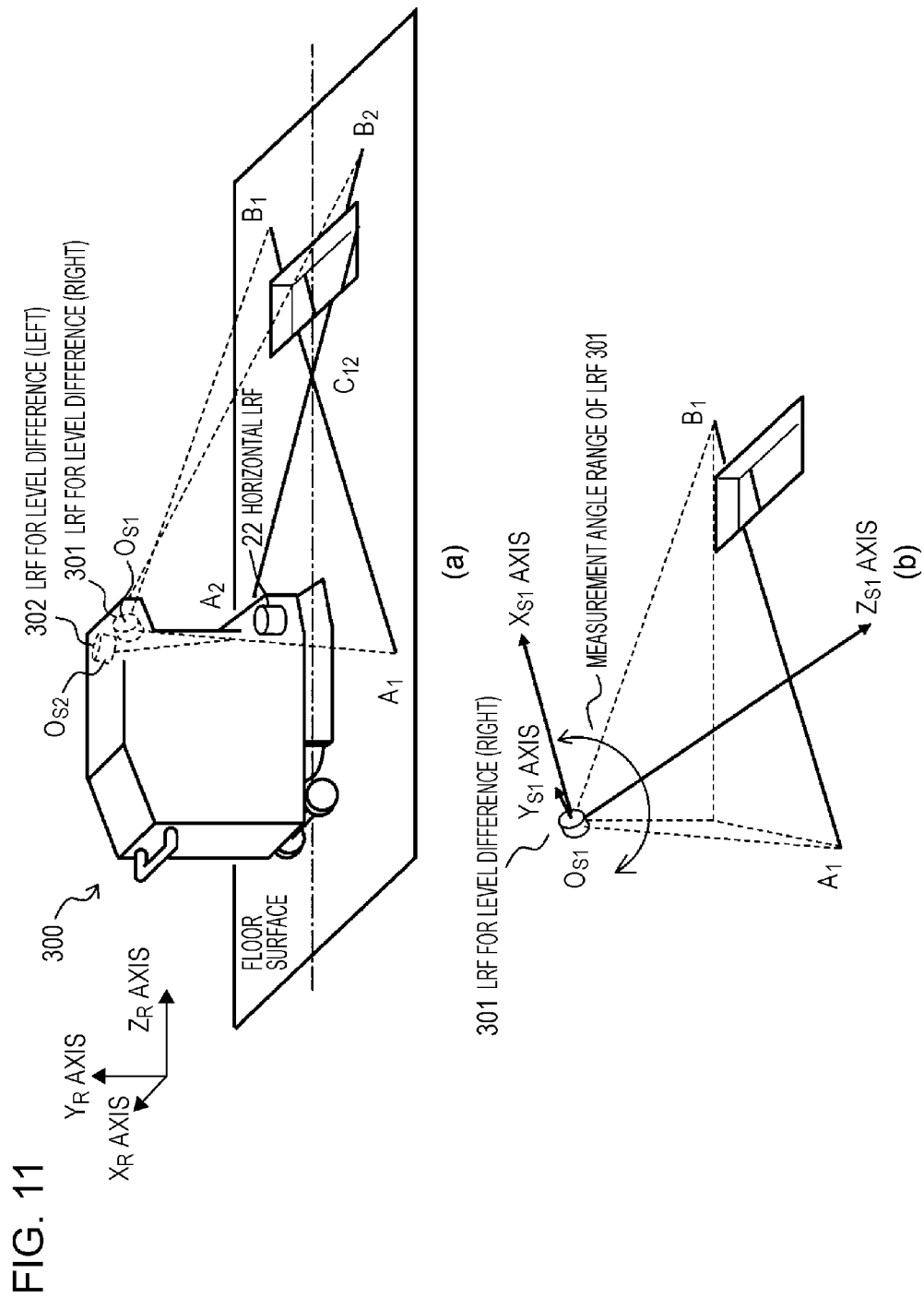
FIG. 11 shows a cleaning robot which is one embodiment of the autonomous mobile system using the surrounding environment recognition device in the present invention, in which (a) is an external view and (b) is a view showing a laser range finder and a coordinate system thereof.
Figure 12:
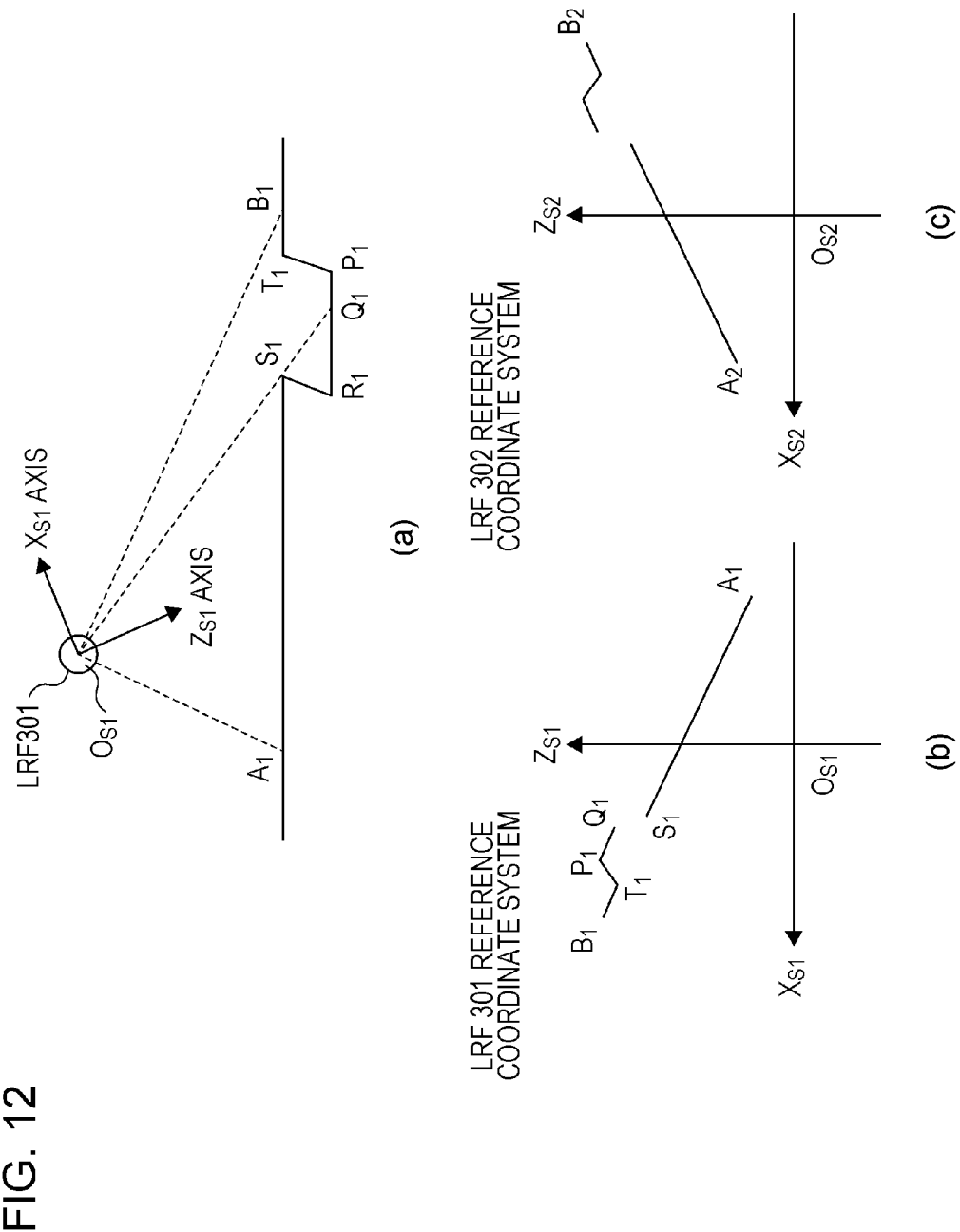
FIG. 12 is a view showing a measurement target and measurement data of the laser range finders mounted in the cleaning robot, in which (a) is a view showing a measurement target in a state where a measurement surface of a laser range finder 101 is set as a sectional surface, (b) is a view showing measurement data of the laser range finder 101, and (c) is a view showing measurement data of a laser range finder 102.

An external appearance of a cleaning robot 300 which is an autonomous mobile system in the present fourth embodiment is shown in FIG. 11($a$). The present cleaning robot 300 is mounted with laser range finders (LRFs) 301 and 302 as two distance sensors instead of the distance image sensor 20 in the first embodiment. They are referred to as "LRFs for a level difference" below for distinguishing from the LRF attached in a horizontal direction, that is, the "horizontal LRF" 22. The horizontal LRF and the LRFs for a level difference may be a same model or may be different models.

The aforementioned LRFs for a level difference 301 and 302 are attached to be obliquely downward to a floor surface ($X_R Z_R$ plane in the $X_R Y_R Z_R$ coordinate system of a robot reference) being mutually separated by about several tens mm to 100 mm in a right-left direction ($X_R$ axis direction in the cleaning robot reference coordinate system) so that surfaces which are formed with infrared laser light for measurement scanned, that is, measurement surfaces intersect with the floor surface at a distance of several tens cm to several m from attachment positions. Since a measurement surface of the horizontal LRF 22 is in parallel to the floor surface, it is impossible to measure a level difference lower than the floor surface or an obstacle near the floor surface, but the LRFs for a level difference are attached obliquely downward as described above, thus it is possible to detect a level difference lower than the floor surface and an obstacle near the floor surface.

Each of the LRFs for a level difference 301 and 302 is able to project infrared laser light to a semicircular area in a range of −90 degrees to +90 degrees in the measurement surface to perform measurement of an object. Here, a center of the measurement range, that is, a 0-degree direction is defined as a front side of the LRF. Further, as shown in FIG. 11($b$), as a coordinate system of an LRF 301 reference, an $X_{S1} Y_{S1} Z_{S1}$ coordinate system in which an emission position of infrared laser light, that is, an origin of measurement is $O_{S1}$, the front side is taken as a $Z_{S1}$ axis, a direction perpendicular to the measurement surface is taken as a $Y_{S1}$ axis, and a direction perpendicular to the $Z_{S1}$ axis and the $Y_{S1}$ axis is taken as an $X_{S1}$ axis is defined. In the same manner, as a coordinate system of an LRF 302 reference, an $X_{S2}Y_{S2}Z_{S2}$ coordinate system is defined.

The $Z_{S1}$ axis of the LRF for a level difference 301 and the $Z_S2$ axis of 302 are attached in directions being rotated only by $θ_Y$[deg] to mutually opposite directions around the $Y_R$ axis with respect to an advancing direction of the robot, that is, a $Z_R$ direction. Thus, intersection lines of the measurement surfaces of the LRFs for a level difference 301 and 302 with the floor surface are straight lines which are inclined only by $θ_Y$[deg] and $-θ_Y$[deg], respectively to the $Z_R$ axis. Note that, $θ_Y$=45 degrees in the present fourth embodiment, but not limited thereto. In FIG. 11(a), these straight lines are shown with $A_1B_1$ and $A_2B_2$, respectively. The two straight lines intersect at a point $C_{12}$ at a distance of about 1 m in the front side of the robot main body. These straight lines $A_1B_1$ and $A_2B_2$ show measurable areas of the LRFs for a level difference 301 and 302 on the floor surface. Since a scanning direction of projection light is one-dimensional, the LRF is not able to measure an area in a two-dimensional form at a time like the distance image sensor, but by combining the two LRFs which are arranged obliquely downward as described above, it is possible to cover a relatively wide range in the front side of the cleaning robot as a measurement range.

Distances from the aforementioned cleaning robot 300 main body to the measurable areas $A_1B_1$ and $A_2B_2$ of the LRFs for a level difference 301 and 302 are able to be adjusted to some extent by adjusting attachment positions and angles of the LRFs for a level difference 301 and 302. When the measurable areas are too far from the cleaning robot 300 main body, measurement omission is possibly caused for a level difference and an obstacle which exist closer. To the contrary, in the case of being too close to the cleaning robot main body, even when a level difference or an obstacle is detected during movement, operation for avoiding cannot be performed in time and collision and falling may occur. By considering these things, it is desirable that the measurable areas are set at a close distance as much as possible in a range where the operation for avoiding is allowed.

In FIG. 11(a), a level difference exists on the floor surface in the front side of the cleaning robot 300. Description will be given what data is acquired in such a case by measurement of the LRF for a level difference 301 by using FIG. 12(a). FIG. 12(a) is a view cut along the measurement surface of the LRF for a level difference 301, that is, an $X_{S1}Z_{S1}$ plane. In the case of only the floor surface in which a level difference does not exist, the projection light from the LRF 301 is irradiated on a line segment connecting $A_1$ and $B_1$, and a distance of this part is measured, but when there is a level difference, distances in ranges of $A_1$ to $S_1$ (floor surface), $Q_1$ to $P_1$ (bottom surface of the level difference), $P_1$ to $T_1$ (side surface of the level difference) and $T_1$ to $B_1$ (floor surface) are measured. A range from $R_1$ to $Q_1$ of the bottom surface of the level difference becomes a blind spot when viewed from the LRF for a level difference 301 and is therefore not measured.

The aforementioned LRF for a level difference 301 outputs distance information to a measurement target object in the measurement surface ($X_{S1}Z_{S1}$ plane in the $X_{S1}Y_{S1}Z_{S1}$ coordinate system) to a computing device 330 of the cleaning robot 300 (refer to FIG. 13) as a polar coordinate format, that is, data composed of a set of an angle θ and a distance r from a measurement origin $O_{S1}$ in θ.

Figure 13:
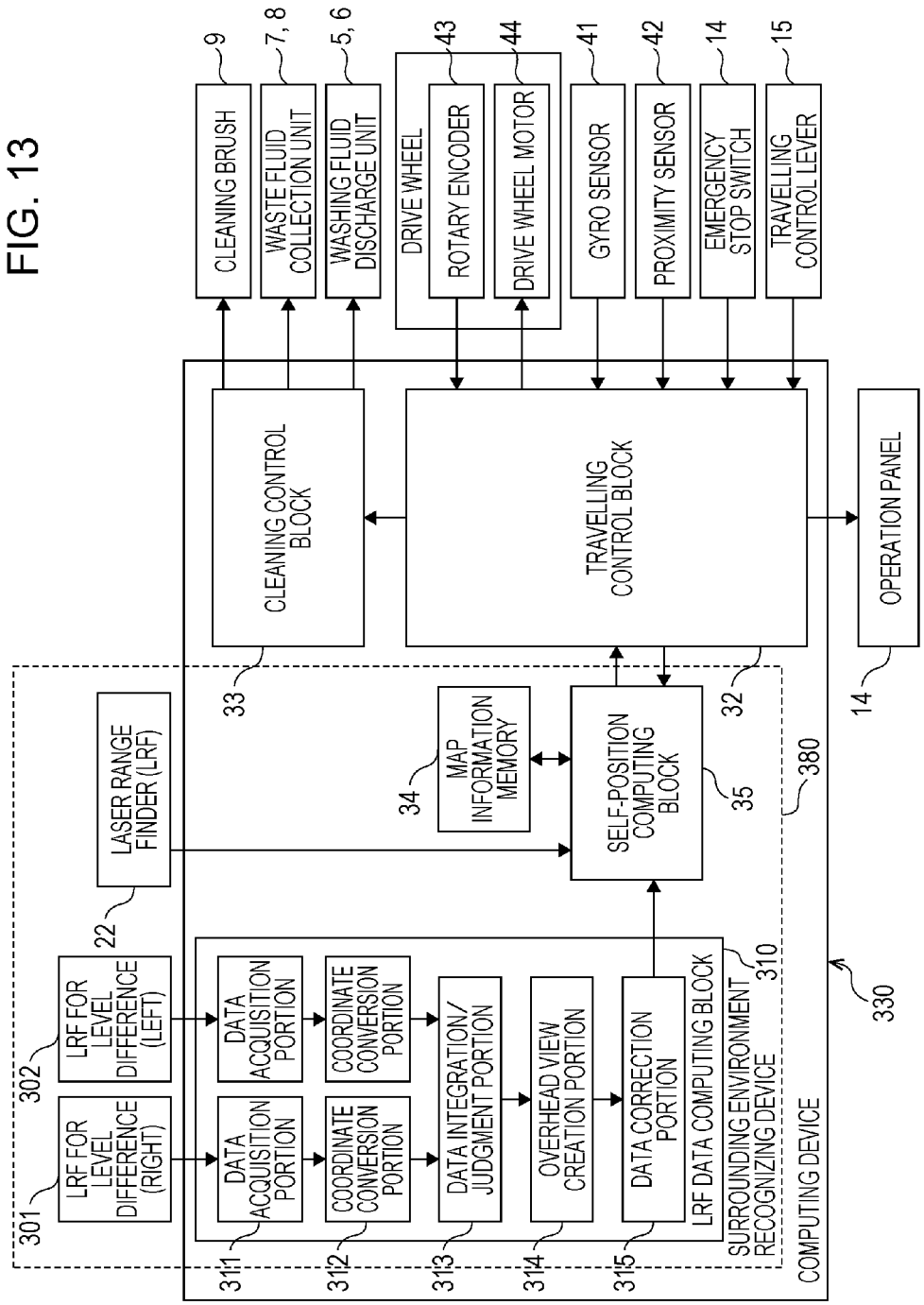
FIG. 13 is a block diagram showing an internal structure of the cleaning robot.

A block diagram of the cleaning robot 300 in the present fourth embodiment is shown in FIG. 13. The computing device 330 in the cleaning robot 300 includes an LRF data computing block 310 instead of the distance image computing block 31 in the cleaning robot 1 of the first embodiment. Other configurations are same as those of the first embodiment. Note that, 380 denotes a surrounding environment recognition device.

A data acquisition portion 311 existing in the aforementioned LRF data computing block 310 converts polar coordinate data which is acquired from the LRF for a level difference 301 into an orthogonal coordinate and creates data plotted on the $X_{S1}Z_{S1}$ plane. This is shown in FIG. 12(b). In FIG. 12(a), it is found that points corresponding to $A_1$ to $S_1$ (floor surface), $Q_1$ to $P_1$ (bottom surface of the level difference), $P_1$ to $T_1$ (side surface of the level difference), and $T_1$ to $B_1$ (floor surface) are measured, but $R_1$ to $Q_1$ of the bottom surface of the level difference serving as a blind spot when viewed from the LRF 301 is not measured, so that data does not exist. In the same manner, measurement data received from the LRF for a level difference 302 is converted into an orthogonal coordinate and data plotted on the $X_{S2}Z_{S22}$ plane in the $X_{S2}Y_{S2}Z_{S2}$ coordinate system (coordinate system in which $O_{S1}X_{S1}Y_{S1}Z_{S1}$ is substituted with $O_{S2}X_{S2}Y_{S2}Z_{S2}$ in FIG. 11(b)) is created. This is shown in FIG. 12(c).

Subsequently, a coordinate conversion portion 312 existing in the LRF data computing block 310 applies coordinate conversion processing to the data of the LRF for a level difference 301, which is created in the data acquisition portion 311. By using parameters of the attachment position and angle of the LRF for a level difference 301 with respect to the robot 300 main body, which are stored in advance, measurement data is converted from a coordinate value in the coordinate system of an LRF 301 reference ($X_{S1}Y_{S1}Z_{S1}$ coordinate system) into a coordinate value in the coordinate system of a robot 300 main body reference ($X_RY_RZ_R$ coordinate system). In the same manner, coordinate conversion processing is also applied to the data of the LRF for a level difference 302 for converting from a coordinate value in the coordinate system of an LRF 302 reference ($X_{S2}Y_{S2}Z_{S2}$ coordinate system) into a coordinate value in the coordinate system of the robot main body reference ($X_RY_RZ_R$ coordinate system). Thereby, three-dimensional point group data of the cleaning robot main body reference is able to be acquired from the data of the LRFs for a level difference 301 and 302.

Then, the data is transmitted to a data integration/judgment portion 313 as the concave part judgment portion. With the coordinate conversion processing at a previous stage, two pieces of data of the LRFs for a level difference 301 and 302 are represented as the same three-dimensional point group data of the robot 300 main body reference, which are therefore able to be integrated into one piece of data. Further, in the data integration/judgment portion 313, in the same manner as the first embodiment, label information of the "level difference", the "obstacle", the "floor surface", the "unspecified" or the like is added to each point constituting the three-dimensional point group data depending on a value of height from $Y_R$ in the coordinate system of the robot main body, that is, the floor surface.

The three-dimensional point group data to which the label information is added is transmitted to an overhead view creation portion 314 as the overhead view data creation portion. In the overhead view creation portion, by plotting the three-dimensional point group data in the $X_RZ_R$ plane of the coordinate system of the robot main body reference, an overhead view image seen from above the robot main body is created. This overhead view image is shown in FIG. 14(a). In this figure, points corresponding to $A_1$, $B_1$, $P_1$ and the like in FIGS. 12(b) and (c) before integration are represented being put a dash on like $A_1'$, $B_1'$ and $P_1'$, respectively.

The overhead view image is transmitted to a data correction portion 315 as the correction processing portion and correction of a position of the level difference is performed here. The data correction portion searches ranges from $A_1'$ to $B_1'$ and $A_2'$ to $B_2'$ that measurement data points exist in the overhead view image. When the label information of the measurement data point is the "level difference", a position of the level difference is corrected to a side close to the cleaning robot main body only by a correction amount L described below. At the time, the label remains as the "level difference". This correction processing corresponds to substituting with a position of the floor surface when it is premised that not the level difference but the floor surface exists at the position of the level difference.

Description will be given for calculation of a correction amount of a level difference by using FIG. 15. As to a point $U_1'$ on a level difference $P_1'Q_1'$, when a position of the floor surface when it is premised that not the level difference but the floor surface exists at the position is $V_1'$, the correction amount L corresponds to $U_1'V_1'$.

Figure 15:
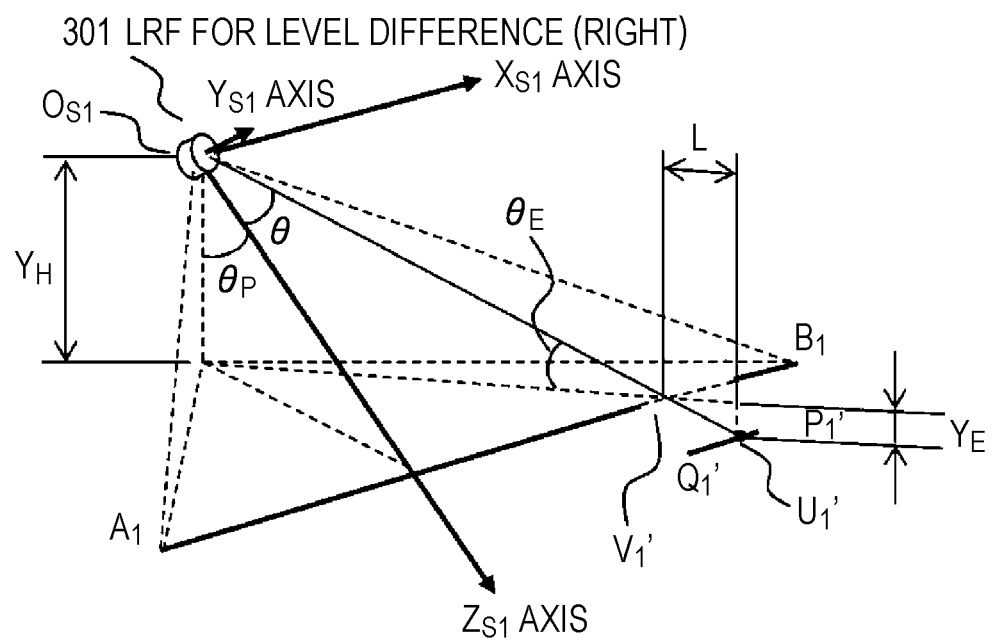
FIG. 15 is a view explaining calculation of a correction amount in an overhead view of the cleaning robot.

When a depth of the level difference (corresponding to a coordinate value $Y_R$ of the three-dimensional point group data) $Y_E$ and $\theta_E$ shown in FIG. 15 are used, L is represented by $$L = Y_E / \tan \theta_E.$$

With an attachment angle $\theta_P$ of the LRF 301 and an angle $\theta$ formed by $O_{S1}'O_1'$ and the $Z_S$, axis in the measurement surface of the LRF 301, $\theta_E$ is represented by $$\sin \theta_E = \cos \theta_P \cdot \cos \theta,$$

and therefore, $$L = Y_E / \tan(\sin^{-1}(\cos \theta_P \cdot \cos \theta)).$$

With the formulas above, when as to an arbitrary point on the level difference, $Y_E$, $\theta_P$ and $\theta$ of the point are given, it is possible to calculate the correction amount L of the level difference position for the point.

The data correction portion 315 calculate the aforementioned correction amount L for all points having the "level difference" labels which require correction among the three-dimensional point group data included in the overhead view image, and newly generates an overhead view image in which correction of a distance L is performed. The overhead view image after the correction is performed in the data correction portion 315 is shown in FIG. 14(b). It is found that line segments $P_1'Q_1'$ and $P_1'T_1'$ showing a level difference are displayed at distances far from a line segment $A_1'B_1'$ showing the floor surface in FIG. 14(a), but a level difference position $S_1'T_1'$ exists on the same straight line with the floor surface $A_1'B_1'$ in FIG. 14(b).

When correction is not performed, a distance to an edge position of the level difference on the overhead view is to have a value ($O_R Q_1'$ of FIG. 14(a)) farther than a distance to a true edge position of the level difference ($O_R S_1'$ shown in the same figure) due to influence of a blind spot, and the value approaches a true value as the cleaning robot main body becomes close to the level difference. That is, as the cleaning robot becomes close to the level difference, the edge position of the level difference is to become close gradually compared with first measurement.

In the autonomous mobile robot like the cleaning robot, it is necessary to accurately grasp a position of a surrounding level difference for travelling safely in an unmanned state. Even when a position of an edge of the level difference which is detected fluctuates during movement, normally, it is possible to avoid falling by amending a moving velocity and a moving direction by the travelling control block in each case. However, it is considered that a level difference suddenly appears in a visual field range from an area which has been out of the visual field range of the distance image sensor till then, including a case of turning abruptly, starting abruptly, etc., and in such a case, there is a possibility that operation for avoiding cannot be performed in time. Though double and treble fall prevention measures are taken for the autonomous mobile robot by providing a floor surface detection sensor or the like in a lower part of a housing individually other than a surrounding environment detecting device like the LRF for a level difference, etc., when a position measurement error due to a blind spot as described above still occurs frequently, it is impossible to eliminate a possibility that behavior becomes unstable because the floor surface detection sensor reacts excessively, etc.

Against this, in the cleaning robot of the present fourth embodiment, since correction of a position of a level difference as described above is applied by the data correction portion 315, an edge of the level difference is at a correct position ($O_R S_1'$ shown in FIG. 14(b)) at all times.

Note that, an equivalent effect is able to be achieved only by mechanical substitution processing without performing calculation of the level difference position correction amount L and correction based on it as described above. For example, when line segments $P_1'Q_1'$ and $P_1'T_1'$ to which the "level difference" label is added shown in FIG. 14(a) exist, processing for substituting them with a line segment $S_1'T_1'$ mechanically is considered. In this case, however, for example, when measurement for $S_1'$ which is an end of the floor surface has a problem of reflectance on a surface, noise or the like and is measured as a position $S_1''$ (not shown) separated from $S_1'$, the line segment is corrected not to $S_1'T_1'$ but to $S_1''T_1'$, so that the edge of the level difference is deviated from a true position. On the other hand, in the calculation of the level difference position correction amount L described above, L is firmly calculated only by $Y_E$ which is the depth of the level difference, and the attachment angles $\theta_P$ and the measurement angle $\theta$ of the LRFs for a level difference 301 and 302, so that level difference data after the correction is not affected even when there is an error in the position of the end $S_1'$ of the floor surface. That is, by calculating the level difference correction amount L and performing the correction only by an appropriate amount in each case, it is possible to obtain the appropriate edge of the level difference even when there is an error in some degree in measuring of a measurement value of the end $S_1'$ of the floor surface.

Since the LRFs 301 and 302 are only able to perform one-dimensional scanning differently from the distance image sensor, a measurable area is a straight-line area on the floor surface, so that it is impossible to detect a level difference which is not on this straight line when the cleaning robot 300 is in a still state. However, when measurement is performed successively while the cleaning robot 300 main body is travelling, the straight line showing the measurable area moves on the floor surface, resulting that a whole range on the floor surface is able to be included in the measurement area.

In the cleaning robot 300 of the present fourth embodiment, the self-position recognition method same as the first embodiment is used to calculate at which position in a current map the cleaning robot 300 itself exists from the odometry information and the obstacle/level difference information acquired by the horizontal LRF 22. Overhead view data in which the level difference information acquired from the LRFs for a level difference 301 and 302 is included is displayed being overlapped on this map and the overhead view data is overwritten to a current position at that time and updated in accordance with movement of the cleaning robot 300. At this time, when the measurement point $Q_1'$ of an end of the level difference is corrected to the position of the edge $S_1'$ correctly in the data correction portion 315, a set of points on a border between a point of the "floor surface" label and a point of the "level difference" label which are formed by overwriting and updating is to represent the edge of the level difference correctly.

FIG. 16(a) to (d) show comparison of detection results of cases where correction of a level difference position is performed and not performed. When the correction of a level difference position is not performed, a point showing an end of a level difference on an overhead view is deviated to a depth side from a true end of the level difference (side far from the cleaning robot main body), and further, as the cleaning robot 300 moves, a blind spot of the LRF changes, thereby a deviation amount changes. This situation is shown in FIG. 16(a). Information on a level difference area acquired by overlapping these data on a map has a shape as shown in FIG. 16(b), and a position of an edge closer to the cleaning robot main body is to be deviated from an actual position of the level difference edge. On the other hand, when the correction of the level difference position is performed, a point showing the end of the level difference on the overhead view is acquired at a current position as shown in FIG. 16(c), so that by overlapping this data on the map, information on the correct level difference area is to be acquired as shown in FIG. 16(d). Accordingly, it is found that by performing correction of a level difference position and overlapping a result thereof on a map, it is possible to detect an area where the level difference exists and an edge thereof correctly.

The level difference information extracted as above is integrated with information on an obstacle higher than the floor surface, which is extracted in the same manner, and transmitted to the self-position computing block 35 as level difference/obstacle information. A format of the level difference/obstacle information is able to be converted into an arbitrary format so as to be easily processed by the travelling control block 32 later. The coordinate system of the data is also able to be transmitted being remained as the $X_R Y_R Z_R$ orthogonal coordinate system of the cleaning robot reference and is also able to be converted into a polar coordinate (R–θ coordinate system). In addition to a method for converting all the obstacles and level differences which are detected into data, methods for performing thinning and interpolation of data and noise removal processing, or extracting only data of an obstacle and a level difference closest to the cleaning robot 300 main body are also considered.

Configurations and operation of other parts of the cleaning robot 300, including self-position recognition and cleaning, are same as those described in the first embodiment and description thereof will be omitted.

Note that, PTL 2 described in the first embodiment above is similar to the present invention in terms of creating overheard view data for correction of level difference information, but uses the stereo camera to acquire three-dimensional information, so that it is not assumed that correction of level difference information from first-dimensional measurement data of the LRFs for a level difference 301 and 302 like the present fourth embodiment is performed. Further, an area where a measurement point does not exist is only judged as a dangerous area and information on an edge position of a level difference is not corrected in PTL 2, but, in the present fourth embodiment, even when the LRFs for a level difference 301 and 302 are used as the distance sensors, it is possible to correct deviation of the edge position of the level difference caused by a blind spot correctly. Further, by performing correction for the edge position of the level difference, the correct edge position of the level difference is able to be acquired, thus making it possible to use edge information after the correction as a key of self-position recognition. Accordingly, accuracy of the self-position recognition on a map is enhanced, thus making it possible to enhance reliability of travelling based on map information of the autonomous mobile system.

As above, in the present fourth embodiment, even when the LRFs for a level difference 301 and 302 are used as the distance sensors of the cleaning robot 300 which is the autonomous mobile system, by correcting deviation of the edge position of the level difference caused by a blind spot correctly and extracting the edge of the level difference accurately, it is possible to prevent falling into the level difference and enhance accuracy of autonomous movement.

Further, by combining the present fourth embodiment with the second embodiment or the third embodiment, it is possible to realize a monitoring robot mounted with LRFs for a level difference and an automatic conveying robot mounted with LRFs for a level difference.

Other Embodiment

The surrounding environment recognition device of the present invention is able to be used for commercial use, consumer use, and other applications as an independent device, and in addition, also used by being incorporated to a part of a versatile mobile information terminal or the like or with a part or all of a computing circuit made into an integrated circuit (IC).

In the fourth embodiment, processing for correcting an edge position of a level difference is performed for single measurement, but is also able to be performed after integrating results of measurement of a plurality of times. When results of measurement of a plurality of times are integrated, two-dimensional level difference information is acquired as shown in FIGS. 16(a) and (b), thus making it possible to perform correction of an edge position of a level difference caused by a blind spot with processing similar to that of the first embodiment.

Though one distance image sensor 20 is used in the first embodiment and two LRFs for a level difference 301 and 302 are used in the fourth embodiment, the number thereof may be a different number in each case. Further, the present invention is also applicable to a case where the distance image sensors and LRFs are mounted in a plurality of pieces to acquire distance information by using them in combination by combining the first embodiment and the fourth embodiment.

In the first to fourth embodiments above, the obstacle/level difference judgment portion 38 as one example of the concave part judgment portion judges, as shown in FIGS. 3(a) and (b), the convex area K higher than a floor, that is, an "obstacle", the concave area C lower than the floor surface F, that is, a "level difference", and the floor surface area F, that is, a "floor surface", but the concave part judgment portion of the present invention may merely be able to judge at least the concave area lower than the floor surface.

Though description has been given for the cleaning robot, the monitoring robot and the automatic conveying robot as one mode of the autonomous mobile system in the first to fourth embodiments described above, in addition thereto, it is also applicable to other autonomous mobile system, for example, such as an automatic traveling vehicle, a robot for care, a robot for disaster relief, a robot for farm work and a robot for entertainment.

The present invention and embodiments are summed up as follows.

A surrounding environment recognition device 80, 380 of the present invention is characterized by including:

a distance sensor 20, 301, 302;

a concave part judgment portion (obstacle/level difference judgment portion 38, data integration/judgment portion 313) that judges at least a concave area C lower than a floor surface F based on distance data acquired from the distance sensor 20, 301, 302;

an overhead view data creation portion 39, 314 that performs coordinate conversion of the distance data with the floor surface F as a reference to create overhead view data; and a correction processing portion 40, 315 that, in the overhead view data, corrects deviation of a position of a border between a concave area which is caused by a blind spot of the distance sensor 20 and an area other than the concave area.

In the aforementioned structure, the concave part judgment portion (obstacle/level difference judgment portion 38, data integration/judgment portion 313) judges at least the concave area C based on the distance data acquired from the distance sensor 20, 301, 302, the overhead view data creation portion 39 performs coordinate conversion of the distance data with the floor surface F as the reference to create the overhead view data, and the correction processing portion 40, 315 corrects the deviation of the position of the border between the concave area which is caused by the blind spot of the distance sensor 20, 301, 302 and the area other than the concave area. For example, correction is performed with an area U where distance data does not exist, which is caused by the blind spot of the distance sensor 20, 301, 302 in the overhead view data in which the concave area C is represented as the concave area C.

Accordingly, according to the surrounding environment recognition device 80, 380 of the present invention, it is possible to enhance accuracy of recognizing a surrounding environment by detecting a level difference reliably and accurately even when there is a blind spot.

In one embodiment, the correction processing portion 40, 315 determines possibility/impossibility of correction of the deviation of the position of the border based on whether or not data judged by the concave part judgment portion (obstacle/level difference judgment portion 38, data integration/judgment portion 313) is arranged in a specific order in the overhead view data.

According to the aforementioned embodiment, since the possibility/impossibility of the correction of the deviation of the position of the border, and possibility/impossibility of correction of an area where the data is missing are determined based on whether or not the data judged by the concave part judgment portion (obstacle/level difference judgment portion 38, data integration/judgment portion 313) is arranged in the specific order, even when an unspecified area which is caused when measurement becomes impossible due to noise or the like is mixed with an unspecified area caused by a blind spot, it is possible to detect a size of the blind spot accurately.

The specific order may be, for example, an order that a convex area or a floor surface area, an unspecified area U and the concave area C are arranged in order closer to the distance sensor 20, 301, 302.

In one embodiment, the correction processing portion 40 calculates a size of the blind spot of the distance sensor 20 based on an attachment angle $\theta_S$ of the distance sensor 20, depth information h of the concave area C and distance data $L_{-2}$ of the concave area C, and determines a correction amount h·tan $\theta_S$ to the concave area C.

According to the aforementioned embodiment, it is possible to determine the correction amount to the concave area C easily and accurately.

An autonomous mobile system 1, 101, 201, 300 of the present invention is characterized in that, It includes the surrounding environment recognition device 80, 380 and it moves while recognizing a movable area in a front side of an advancing direction.

The autonomous mobile system 1, 101, 201, 300 of the present invention is able to detect the concave area, that is, an edge of a level difference C by the surrounding environment recognition device 80, 380 accurately and reliably, thus making it possible to prevent falling into the level difference C.

The autonomous mobile system 1, 101, 201, 300 of one embodiment holds map data which is able to be updated, and moves while performing estimation of a self-position on the map data based on data from the surrounding environment recognition device 80, 380.

According to the aforementioned embodiment, it is possible to accurately perform the estimation of the self-position on the map data with the edge of the concave area C after correction by the surrounding environment recognition device as a mark and improve efficiency of movement.

A surrounding environment recognition method of the present invention is characterized by comprising:

measuring a floor surface (F) by a distance sensor (20, 301, 302) which is arranged in a frontward and obliquely downward direction to generate three-dimensional coordinate data of a floor surface reference, judging a floor surface area and a concave area (C) lower than the floor surface (F) based on the three-dimensional coordinate data and labeling the three-dimensional coordinate data to create overhead view data, and scanning the overhead view data, and when labels are arranged in a specific order, performing correction of deviation of a position of a border between a concave area which is caused by a blind spot of the distance sensor (20) and an area other than the concave area.

According to the surrounding environment recognition method of the present invention, it is possible to detect the concave area C reliably and accurately even when there is the blind spot, thus making it possible to enhance accuracy of recognizing a surrounding environment.

In addition, it is possible to add various modifications without departing from the spirit of the present invention.

INDUSTRIAL APPLICABILITY

The present invention relates to a surrounding environment recognition device for detecting an obstacle or a level difference included in image data to be measured and an autonomous mobile system using the same, and the surrounding environment recognition device itself is able to be used for commercial use, consumer use, and other applications including cleaning, monitoring and automatic conveyance, as an independent device, and in addition, also used by being incorporated to a part of another device or with a part or all of the device made into an integrated circuit (IC).

REFERENCE SIGNS LIST

1, 101, 300 cleaning robot (autonomous mobile system)
2 drive wheel 3 driven wheel
4 battery
5 washing fluid tank
6 washing fluid discharge portion
7 waste fluid tank
8 waste fluid suction inlet
9 cleaning brush
10 motor
11 housing
12 protection member
13 operation panel
20 distance image sensor
21 window
22 laser range finder (LRF)
30, 330 computing device
31 distance image computing block
32 travelling control block
33 cleaning control block
34 map information memory
35 self-position computing block
36 three-dimensional coordinate computing portion
37 coordinate conversion portion
38 obstacle/level difference judgment portion (concave part judgment portion)
39 overhead view creation portion
301, 302 laser range finder (LRF) for level difference
310 LRF data computing block

The invention claimed is:

1. A surrounding environment recognition device, comprising:
 a distance sensor;
 a concave part judgment portion that judges at least a concave area lower than a floor surface based on distance data acquired from the distance sensor;
 an overhead view data creation portion that performs coordinate conversion of the distance data with the floor surface as a reference to create overhead view data, and
 a correction processing portion that, in the overhead view data, corrects deviation of a position of a border between a concave area which is caused by a blind spot of the distance sensor and an area other than the concave area.

2. The surrounding environment recognition device according to claim 1, wherein the correction processing portion determines possibility/impossibility of correction of the deviation of the position of the border based on whether or not data judged by the concave part judgment portion is arranged in a specific order in the overhead view data.

3. The surrounding environment recognition device according to claim 1, wherein the correction processing portion calculates a size of the blind spot of the distance sensor based on an attachment angle of the distance sensor, depth information of the concave area and distance data of the concave area, and determines a correction amount to the concave area.

4. An autonomous mobile system which comprises the surrounding environment recognition device according to claim 1 and which moves while recognizing a movable area in a front side of an advancing direction.

5. A surrounding environment recognition method, comprising:
 measuring a floor surface by a distance sensor which is arranged in a frontward and obliquely downward direction to generate three-dimensional coordinate data of a floor surface reference,
 judging a floor surface area and a concave area lower than the floor surface based on the three-dimensional coordinate data and labeling the three-dimensional coordinate data to create overhead view data, and
 scanning the overhead view data, and when the labels are arranged in a specific order, performing correction of deviation of a position of a border between a concave area which is caused by a blind spot of the distance sensor and an area other than the concave area.

\* \* \* \* \*